United States Patent
Wu et al.

(10) Patent No.: US 12,284,710 B2
(45) Date of Patent: Apr. 22, 2025

(54) FAST FAILURE RECOVERY WITH MASTER NODE

(71) Applicant: GOOGLE LLC, Mountain View, CA (US)

(72) Inventors: Chih-Hsiang Wu, Taoyuan (TW); Teming Chen, Taoyuan (TW)

(73) Assignee: GOOGLE LLC, Mountain View, CA (US)

(*) Notice: Subject to any disclaimer, the term of this patent is extended or adjusted under 35 U.S.C. 154(b) by 747 days.

(21) Appl. No.: 17/268,178

(22) PCT Filed: Oct. 13, 2020

(86) PCT No.: PCT/US2020/055393
§ 371 (c)(1),
(2) Date: Feb. 12, 2021

(87) PCT Pub. No.: WO2021/076502
PCT Pub. Date: Apr. 22, 2021

(65) Prior Publication Data
US 2022/0304092 A1    Sep. 22, 2022

Related U.S. Application Data

(60) Provisional application No. 62/915,013, filed on Oct. 14, 2019.

(51) Int. Cl.
*H04W 76/19* (2018.01)
*H04W 36/00* (2009.01)
(Continued)

(52) U.S. Cl.
CPC ....... *H04W 76/19* (2018.02); *H04W 36/0069* (2018.08); *H04W 76/15* (2018.02); *H04W 76/30* (2018.02)

(58) Field of Classification Search
CPC .......... H04W 36/0069; H04W 36/305; H04W 76/15; H04W 76/19; H04W 76/30
See application file for complete search history.

(56) References Cited

U.S. PATENT DOCUMENTS

2015/0133122 A1    5/2015  Chen
2018/0278357 A1    9/2018  Kim et al.
(Continued)

FOREIGN PATENT DOCUMENTS

CN    104904290 A    9/2015
CN    104936163 A    9/2015
(Continued)

OTHER PUBLICATIONS

"3rd Generation Partnership Project; Technical Specification Group Radio Access Network; Evolved Universal Terrestrial Radio Access (E-UTRA); Packet Data Convergence Protocol (PDCP) specification (Release 15)," 3GPP TS 36.323 V15.4.0 (Jun. 2019).
(Continued)

*Primary Examiner* — Kashif Siddiqui
(74) *Attorney, Agent, or Firm* — MARSHALL, GERSTEIN & BORUN LLP

(57) ABSTRACT

A UE communicating in DC with an MN and an SN receives a configuration related to a C-SN and at least one condition for connecting to the C-SN, determines that a radio connection between the UE and the MN has failed, and transmits a first indication of the failed radio connection to the SN to initiate a recovery procedure. The UE also releases the configuration and/or the at least one condition, or suspending a procedure, for connecting to the C-SN\.

11 Claims, 25 Drawing Sheets

(51) Int. Cl.
*H04W 76/15* (2018.01)
*H04W 76/30* (2018.01)

(56) References Cited

U.S. PATENT DOCUMENTS

| | | | |
|---|---|---|---|
| 2019/0253941 A1 | 8/2019 | Cirik et al. | |
| 2020/0305216 A1* | 9/2020 | Kim | H04W 76/19 |
| 2021/0112475 A1* | 4/2021 | Kim | H04W 36/0058 |
| 2022/0007259 A1* | 1/2022 | Fujishiro | H04W 76/19 |
| 2022/0053392 A1* | 2/2022 | Wang | H04W 36/0079 |
| 2022/0053587 A1* | 2/2022 | Geng | H04W 76/15 |
| 2022/0150774 A1* | 5/2022 | Wu | H04W 36/0069 |
| 2022/0312282 A1* | 9/2022 | Chang | H04W 36/305 |
| 2022/0377629 A1* | 11/2022 | Rugeland | H04W 36/0079 |
| 2022/0386207 A1* | 12/2022 | Rugeland | H04W 76/15 |

FOREIGN PATENT DOCUMENTS

| | | |
|---|---|---|
| CN | 105917716 A | 8/2016 |
| CN | 106717108 A | 5/2017 |
| CN | 107959983 A | 4/2018 |
| WO | WO-2018/182231 A1 | 10/2018 |
| WO | WO-2020113867 A1 | 6/2020 |

OTHER PUBLICATIONS

"3rd Generation Partnership Project; Technical Specification Group Radio Access Network; NR; Packet Data Convergence Protocol (PDCP) specification (Release 15)," 3GPP TS 38.323 V15.6.0 (Jun. 2019).

"Universal Mobile Telecommunications System (UMTS); LTE; 5G; NR; Multi-connectivity; Overall description; Stage-2 (3GPP TS 37.340 version 15.6.0 Release 15)," ETSI TS 137 340 V15.6.0 (Jul. 2019).

"3rd Generation Partnership Project; Technical Specification Group Radio Access Network; NR; Radio Resource Control (RRC) protocol specification (Release 15)," 3GPP TS 38.331 V15.7.0 (Sep. 2019), section 5.3, pp. 37-80.

"3rd Generation Partnership Project; Technical Specification Group Radio Access Network; Evolved Universal Terrestrial Radio Access (E-UTRA); Radio Resource Control (RRC); Protocol specification (Release 15)," 3GPP TS 36.331 V15.7.0 (Sep. 2019), section 5.3, pp. 68-171.

"NR mobility enhancements," 3GPP TSG RAN Meeting #83 Work Item Description RP-190489.

"WID on DC and CA enhancements," 3GPP TSG RAN Meeting #85 Work Item Description RP-192336.

First Office Action for Chinese Application No. 202080072255.2, dated Dec. 11, 2023.

Huawei "Discussion on Conditional SN Change in MR-DC scenario" 3GPP Draft (2019).

ZTE Corporation, "Discussion on the fast RLF recovery with the applying of CHO and DC," 3GPP Draft (2019).

International Search Report and Written Opinion for Application No. PCT/US2020/055393, dated Dec. 10, 2020.

Qualcomm Incorporated, "Discussion on Handling of Error Scenarios Related to Fast MCG Recovery," 3GPP Draft (2019).

Ericsson, "Fast MCG Recovery in MR-DC," 3GPP Draft (2019).

* cited by examiner

FAST FAILURE RECOVERY WITH MASTER NODE

FIELD OF THE DISCLOSURE

This disclosure relates generally to wireless communications and, more particularly, to fast recovery with a master node and conditional operations related to secondary nodes.

BACKGROUND

This background description is provided for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

The evolution of wireless communications to fifth-generation (5G) standards and technologies provides higher data rates and greater channel capacity, with improved reliability and lower latency, to enhance mobile broadband services. 5G technologies also provide new classes of services for vehicular, fixed wireless broadband, and the Internet of Things (IoT). The 5G air interface is referred to as 5G New Radio (5G NR).

To communicate wirelessly with a network, a user equipment (UE) may establish a connection to the network via at least one network node (e.g., a base station or a serving cell) that supports a fifth-generation core network (5GC). In some situations, the UE can use multi-node connectivity (e.g., dual connectivity) to connect to multiple network nodes at a time. By connecting to multiple nodes, the UE and the network can realize performance improvements in user throughput, mobility robustness, or load balancing. The multiple network nodes can be associated with a same radio access technology (RAT) or different RATs. As an example, the UE can use multi-RAT dual connectivity (MR-DC) or new-radio dual-connectivity (NR-DC) to establish communication with two nodes (e.g., a master node (MN) and a secondary node (SN)).

In telecommunication systems, the Packet Data Convergence Protocol (PDCP) sublayer of the radio protocol stack provides services such as transfer of user-plane data, ciphering, integrity protection, etc. For example, the PDCP layer defined for the Evolved Universal Terrestrial Radio Access (EUTRA) radio interface (see 3GPP TS 36.323) and New Radio (NR) (see TS 38.323) provides sequencing of protocol data units (PDUs) in the uplink direction (from a user equipment (UE) to a base station) as well as in the downlink direction (from the base station to the UE). Further, the PDCP sublayer provides signaling radio bearers (SRBs) and data radio bearers (DRBs) to the Radio Resource Control (RRC) sublayer. Generally speaking, the UE and a base station can use SRBs to exchange RRC messages as well as non-access stratum (NAS) messages and use DRBs to transport data on a user plane.

UEs can use several types of SRBs and DRBs. When operating in dual connectivity (DC), the cells associated with the base station operating the master node (MN) define a master cell group (MCG), and the cells associated with the base station operating as the secondary node (SN) define the secondary cell group (SCG). So-called SRB1 resources carry RRC messages, which in some cases include non-access stratum (NAS) messages over the dedicated control channel (DCCH), and SRB2 resources support RRC messages that include logged measurement information or NAS messages, also over the DCCH but with lower priority than SRB1 resources. More generally, SRB1 and SRB2 resources allow the UE and the MN to exchange RRC messages related to the MN and embed RRC messages related to the SN, and also can be referred to as MCG SRBs. SRB3 resources allow the UE and the SN to exchange RRC messages related to the SN, and can be referred to as SCG SRBs. Split SRBs allow the UE to exchange RRC messages directly with the MN via lower layer resources of the MN and the SN. Further, DRBs terminated at the MN and using the lower-layer resources of only the MN can be referred as MCG DRBs, DRBs terminated at the SN and using the lower-layer resources of only the SN can be referred as SCG DRBs, and DRBs terminated at the MCG but using the lower-layer resources of either the MN or the SN, or both can be referred to as split DRBs.

3GPP specification TS 37.340 (v15.6.0) describes procedures for adding or changing an SN in dual connectivity (DC) scenarios. These procedures involve messaging (e.g., RRC signaling and preparation) between RAN nodes (e.g., base stations or components of a distributed base station) that generally causes latency, which in turn increases the probability of failure of SN addition or SN change procedures. These procedures do not involve conditions associated with the UE, and can be referred to as "immediate" SN addition and change procedures. On the other hand, according to the "conditional" SN addition procedure, the UE receives a configuration for a candidate SN (C-SN) along with a condition from a base station, and initiates a connection to the C-SN (e.g., by performing a random access procedure) only if and when the condition is satisfied.

To further enhance DC operations, the 3GPP organization also has proposed the so-called fast MCG recovery procedure. According to this procedure, when the UE operating in DC detects MCG failure, the UE notifies the SN, which in turns notifies the MN. The MN then sends a recovery message to the UE via the SN.

Certain interactions between the conditional SN addition procedure and the fast MCG recovery can cause one or both procedures to fail. As a result, the UE loses dual connectivity and, in some cases, all network connectivity.

SUMMARY

To ensure proper interaction between a conditional procedure related to a C-SN (e.g., the conditional SN addition procedure) and a procedure for restoring a radio connection with an MN (e.g., the fast MCG recovery procedure), a UE operating in DC with the MN and the SN implements the techniques of this disclosure to adjust the timing or the execution of one of these procedures in view of the other procedure. On the radio access network (RAN) side, the MN in some cases determines which of the two procedures the UE should forgo in favor of the other procedure, and in some cases notifies the C-SN of the procedure for restoring a radio connection. Further, the SN in some cases is configured to process a release indication in view of an ongoing procedure for restoring a radio connection.

These techniques allow the UE and the base stations to reduce latency in executing the conditional procedure and/or the procedure for restoring a radio connection, reduce the rate at which these procedures fail, and ensure the UE and the base stations timely release network resources.

One example embodiment of the techniques of this disclosure is a method for failure recovery in a UE communicating in DC with an MN and an SN. The method includes receiving a configuration related to a C-SN and at least one condition for connecting to the C-SN, determining that a radio connection between the UE and the MN has failed, and transmitting a first indication of the failed radio connection to the SN to initiate a recovery procedure. The method also includes at least one of (i) releasing the configuration and/or the at least one condition, or suspending a procedure, for connecting to the C-SN, (ii) transmitting a second indication of the failed radio connection to the C-SN, (iii) in response to determining that the recovery procedure has failed and that the UE has connected to the C-SN, disconnecting from the C-SN, and (iv) in response to determining that an attempt to connect to the C-SN has failed, aborting the recovery procedure.

Another example embodiment of these techniques is a UE including processing hardware and configured to implement the method above.

Another example embodiment of the techniques of this disclosure is a method for facilitating failure recovery. The method is implemented in a first base station operating as an MN connected with a UE in DC with the MN and a second base station operating as an SN. The method includes determining that the UE is configured for conditionally connecting to a third base station operating as a candidate C-SN, to operate in DC with the MN and the third base station. The method further includes receiving, from the SN, an indication that the UE has detected a failure of a radio connection between the UE and the MN, and sending, to the third base station, at least one of (i) a recovery indication to indicate that the radio connection between the UE and the MN is recovered, or (ii) a release indication to indicate that the third base station should be released from operating as the C-SN.

Yet another example embodiment of the techniques of this disclosure is a method in a first base station for controlling failure recovery at a UE. The method includes receiving, from the UE, an indication that the UE supports (i) a first procedure for recovering a failed radio connection with an MN by transmitting an indication related to the failed radio connection to an SN when the UE operates in DC with the MN and the SN, and (ii) a second procedure for conditionally connecting to a C-SN. The method further includes configuring the UE to not start the first procedure or the second procedure while the other one of the first procedure or the second procedure is in progress.

Still another example embodiment of these techniques is a method for facilitating recovery of a radio connection. The method is implemented in a base station operating as an SN in DC of a UE with an MN and the SN. The method includes receiving, from the MN, a recovery message associated with a procedure for recovering a radio connection between the UE and the MN and sending the recovery message to the UE, during a transmission period. The method further includes receiving, during the transmission period, an indication that the base station is released from operating as the SN, and, in response to the indication, aborting the sending of the recovery message.

Another example embodiment of these techniques is a base station including processing hardware and configured to implement one of the methods above.

DETAILED DESCRIPTION OF THE DRAWINGS

Figure 1:
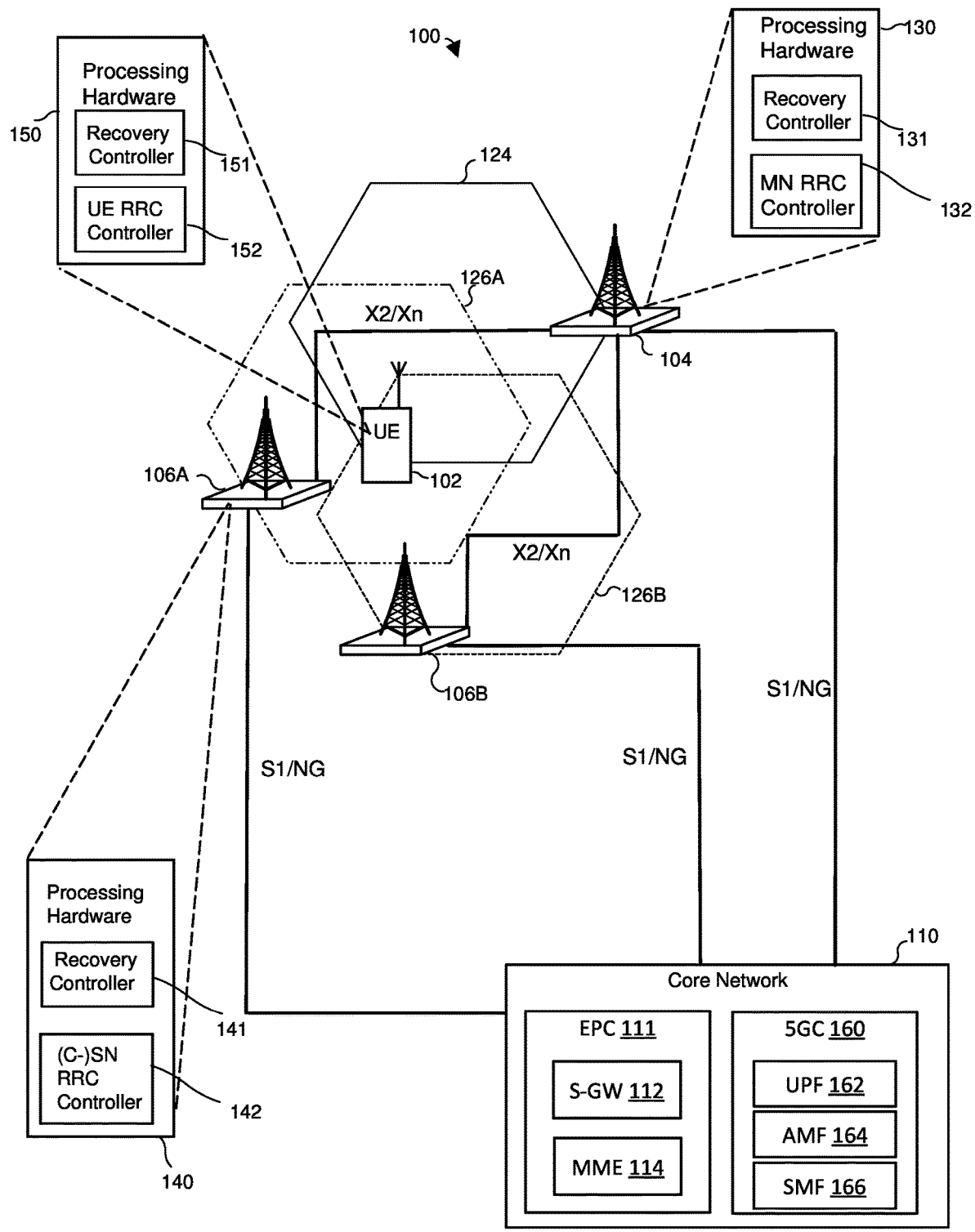
FIG. 1 is a block diagram of an example system in which a radio access network (RAN) and a user equipment (UE) can implement the techniques of this disclosure for managing interaction between conditional procedures related to a secondary node (SN) and a procedure for recovering a radio link between the UE and a master node (MN)

Generally speaking, a UE and/or base station(s) of this disclosure support a conditional procedure related to a C-SN (e.g., the conditional SN addition procedure) and a procedure for recovering a radio connection between the UE and an MN using the SN (e.g., the fast MCG recovery procedure) that overlap in time. For convenience, these procedures can be referred to as "the conditional procedure" and "the recovery procedure," respectively.

Before or after operating in DC, the UE initially can operate in DC with an MN and an SN. The UE can receive a configuration related to a C-SN, such as C-PSCell configuration, and a condition for connecting to the C-SN. The UE then can determine that the radio connection between the UE and the MN has failed. For example, the UE can detect MCG link failure (or, for simplicity, "MCG failure").

In one implementation, the UE releases C-SN connection information, which can include the configuration and/or the condition(s) (including the C-PSCell configuration) for connecting to the C-SN, upon detecting the MCG failure. The UE thus can receive a recovery message which the SN transmits as a part of the recovery procedure. More particularly, because the UE does not forgo the monitoring of transmissions from the SN in favor of transmissions from the C-SN, the UE can receive the recovery message after initiating the recovery procedure.

In another implementation, the UE only suspends the configuration and the condition(s) for connecting to the C-SN for the duration of the recovery procedure. The UE resumes the conditional procedure upon successful completion of the recovery procedure. In yet another implementation, the UE sends an indication of the failed radio connection (e.g., an MCG failure indication) both to the SN and the C-SN. If the UE has not received a recovery message by the time the UE switches from the cell of the SN to the cell of the C-SN, the UE can send the indication of the failed radio connection to the C-SN after completing the recovery procedure and upon successfully connecting to the C-SN.

In still another implementation, the UE performs the conditional procedure related or the recovery procedure in accordance with whether the other procedure has completed successfully. For example, the UE can disconnect from the C-SN after determining that the recovery procedure has failed, or abort the recovery procedure in response to determining that the UE has failed to connect to the C-SN.

The MN of this disclosure in some implementations can send a recovery indication (e.g., an MCG failure recovery message) to the C-SN in addition to the SN. In another implementation, the MN sends a release indication (e.g., a conditional SN Release Request) to the C-SN to effectively abort the conditional procedure.

Further, the MN in some implementations determines which of the recovery procedure or the conditional procedure the UE should perform in the event of an overlap, prior to an MCG failure occurring. The MN notifies the UE accordingly.

Still further, the SN can receive an indication that it should no longer operate as an SN for the UE (e.g., an SN Release Request). When the SN receives this indication while notifying the UE of the radio link recovery by sending the MCG failure recovery message, for example, the SN aborts the transmission of this message.

A known conditional procedure, a known recovery procedure, and example techniques for supporting interactions between these procedures are discussed with reference to FIGS. 1-25 below.

FIG. 1 depicts an example wireless communication system 100 in which communication devices can implement the techniques of this disclosure. The wireless communication system 100 includes a UE 102, a base station 104, a base station 106A, a base station 106B and a core network (CN) 110. The UE 102 initially connects to the base station 104.

In some scenarios, the base station 104 performs an immediate SN addition procedure to configure the UE 102 to operate in DC with the base station 104 and the base station 106A. The base stations 104 and 106A begin to operate as an MN and an SN for the UE 102, respectively. At a later time, the MN 104 can perform an immediate SN change to change the SN of the UE 102 from the base station 106A (source SN, or "S-SN") to the base station 106B (target SN, or "T-SN") while the UE 102 is in DC with the MN 104 and the S-SN 106A. As discussed above, immediate procedures related to the SN, such as SN addition or SN change, do not include conditions to be satisfied prior to the UE performing the immediate procedures.

In another scenario, the base station 104 performs a conditional SN Addition procedure to first configure the base station 106A as a candidate SN (C-SN) for the UE 102. At this time, the UE 102 can be in single connectivity (SC) with the base station 104 or in DC with the base station 104 and another base station such as the base station 106B. In contrast to the immediate SN Addition case discussed above, the UE 102 does not immediately attempt to connect to the C-SN 106A. In this scenario, the base station 104 again operates as an MN, but the base station 106A initially operates as a C-SN rather than SN.

More particularly, when the UE 102 receives a configuration for the C-SN 106A, the UE 102 does not connect to the C-SN 106A until the UE 102 has determined that a certain condition is satisfied (the UE 102 in some cases can consider multiple conditions, but for convenience only the discussion below refers to a single condition). When the UE 102 determines that the condition has been satisfied, the UE 102 connects to the candidate SN 106A, so that the C-SN 106A begins to operate as the SN 106A for the UE 102. Thus, while the base station 106A operates as a C-SN rather than an SN, the base station 106A is not yet connected to the UE 102, and accordingly is not yet servicing the UE 102.

In some scenarios, the condition associated with conditional SN addition can be signal strength/quality, which the UE 102 detects on a candidate primary secondary cell (C-PSCell) of the C-SN 106A, exceeding a certain threshold or otherwise corresponding to an acceptable measurement. For example, when the one or more measurement results the UE 102 obtains on the C-PSCell are above a threshold configured by the MN 104 (or above some other predetermined or pre-configured threshold), the UE 102 determines that the condition is satisfied. When the UE 102 determines that the signal strength/quality on C-PSCell of the C-SN 106A is sufficiently good (measured relative to one or more quantitative thresholds or other quantitative metrics), the UE 102 can perform a random access procedure with the C-SN 106A to connect to the candidate SN 106A. Once the UE 102 successfully completes the random access procedure, the base station 106A begins to operate as an SN, and the C-PSCell becomes a PSCell for the UE 102. The SN 106A then can start communicating data with the UE 102.

In some scenarios, the UE 102 detects that a radio connection between the UE 102 and the MN 104 has failed, e.g., that an MCG failure has occurred, while the UE 102 is in DC with the MN 104 and an SN (e.g., base station 106A/B). In response to the detection, the UE 102 may transmit an indication of the failed radio connection, e.g., an MCG failure indication message, to the SN 106A/B via radio resources of the SN. As a more particular example, the UE 102 can transmit this indication via secondary cell group (SCG) radio resources. For convenience, the discussion below refers to the MCG failure and messages associated with the MCG failure recovery procedure (MCG failure indication and MCG failure recovery). More generally, however, the techniques of this disclosure can pertain to any suitable recovery procedure for any suitable radio connection between a UE and an MN.

As further discussed below with reference to FIG. 5, the SN 106A/B forwards the MCG failure indication message to the MN 104 using an interface message (e.g., RRC Transfer message) over an X2/Xn link, if the MN 104 supports and successfully processes the MCG failure indication message. In another implementation, the SN 106/AB indicates the MCG failure in a suitable information element (IE), field, flag, etc. of an interface message (e.g., RRC Transfer message) and sends the interface message to the MN 104, if the MN 104 does not support and cannot process the MCG failure indication message. In response to receiving the MCG failure indication message or the indication of the MCG failure, the MN 104 can send to the UE 102 an MCG failure recovery message for recovering the MCG failure via the SCG radio resources. The SN 106A/B previously can allocate the SCG radio resources to the UE 102. For example, the SCG radio resources can include one or more physical resource blocks, resource elements or subcarriers in a time unit. The time unit can be one or more ODFM symbols, slots or subframes.

In various configurations of the wireless communication system 100, the base station 104 can be implemented as a master eNB (MeNB) or a master gNB (MgNB), and the base station 106A or 106B can be implemented as a secondary gNB (SgNB) or a candidate SgNB (C-SgNB). The UE 102 can communicate with the base station 104 and the base station 106A or 106B (106A/B) via the same RAT such as EUTRA or NR, or different RATs. When the base station 104 is an MeNB and the base station 106A is a SgNB, the UE 102 can be in EUTRA-NR DC (EN-DC) with the MeNB and the SgNB. In this scenario, the MeNB 104 may or may not configure the base station 106B as a C-SgNB to the UE 102. When the base station 104 is an MeNB and the base station 106A is a C-SgNB for the UE 102, the UE 102 can be in SC with the MeNB. In this scenario, the MeNB 104 may or may not configure the base station 106B as another C-SgNB to the UE 102.

In some cases, an MeNB, an SeNB or a C-SgNB is implemented as an ng-eNB rather than an eNB. When the base station 104 is a Master ng-eNB (Mng-eNB) and the base station 106A is an SgNB, the UE 102 can be in next generation (NG) EUTRA-NR DC (NGEN-DC) with the Mng-eNB and the SgNB. In this scenario, the MeNB 104 may or may not configure the base station 106B as a C-SgNB to the UE 102. When the base station 104 is an Mng-NB and the base station 106A is a C-SgNB for the UE 102, the UE 102 can be in SC with the Mng-NB. In this scenario, the Mng-eNB 104 may or may not configure the base station 106B as another C-SgNB to the UE 102.

When the base station 104 is an MgNB and the base station 106A/B is an SgNB, the UE 102 may be in NR-NR DC (NR-DC) with the MgNB and the SgNB. In this scenario, the MeNB 104 may or may not configure the base station 106B as a C-SgNB to the UE 102. When the base station 104 is an MgNB and the base station 106A is a C-SgNB for the UE 102, the UE 102 may be in SC with the MgNB. In this scenario, the MgNB 104 may or may not configure the base station 106B as another C-SgNB to the UE 102.

When the base station 104 is an MgNB and the base station 106A/B is a Secondary ng-eNB (Sng-eNB), the UE 102 may be in NR-EUTRA DC (NE-DC) with the MgNB and the Sng-eNB. In this scenario, the MgNB 104 may or may not configure the base station 106B as a C-Sng-eNB to the UE 102. When the base station 104 is an MgNB and the base station 106A is a candidate Sng-eNB (C-Sng-eNB) for the UE 102, the UE 102 may be in SC with the MgNB. In this scenario, the MgNB 104 may or may not configure the base station 106B as another C-Sng-eNB to the UE 102.

The base stations 104, 106A, and 106B can connect to the same core network (CN) 110 which can be an evolved packet core (EPC) 111 or a fifth-generation core (5GC) 160. The base station 104 can be implemented as an eNB supporting an S1 interface for communicating with the EPC 111, an ng-eNB supporting an NG interface for communicating with the 5GC 160, or as a base station that supports the NR radio interface as well as an NG interface for communicating with the 5GC 160. The base station 106A can be implemented as an EN-DC gNB (en-gNB) with an S1 interface to the EPC 111, an en-gNB that does not connect to the EPC 111, a gNB that supports the NR radio interface as well as an NG interface to the 5GC 160, or a ng-eNB that supports an EUTRA radio interface as well as an NG interface to the 5GC 160. To directly exchange messages during the scenarios discussed below, the base stations 104, 106A, and 106B can support an X2 or Xn interface.

Among other components, the EPC 111 can include a Serving Gateway (S-GW) 112 and a Mobility Management Entity (MME) 114. The S-GW 112 in general is configured to transfer user-plane packets related to audio calls, video calls, Internet traffic, etc., and the MME 114 is configured to manage authentication, registration, paging, and other related functions. The 5GC 160 includes a User Plane Function (UPF) 162 and an Access and Mobility Management (AMF) 164, and/or Session Management Function (SMF) 166. Generally speaking, the UPF 162 is configured to transfer user-plane packets related to audio calls, video calls, Internet traffic, etc., the AMF 164 is configured to manage authentication, registration, paging, and other related functions, and the SMF 166 is configured to manage PDU sessions.

As illustrated in FIG. 1, the base station 104 supports a cell 124, the base station 106A supports a cell 126A, and the base station 106B supports a cell 126B. The cells 124 and 126A can partially overlap, as can the cells 124 and 126B, so that the UE 102 can communicate in DC with the base station 104 (operating as an MN) and the base station 106A (operating as an SN) and, upon completing an SN change, with the base station 104 (operating as MN) and the SN 106B. More particularly, when the UE 102 is in DC with the base station 104 and the base station 106A, the base station 104 operates as an MeNB, an Mng-eNB or an MgNB, and the base station 106A operates as an SgNB or an Sng-eNB, when the UE 102 is in SC with the base station 104, the base station 104 operates as an MeNB, an Mng-eNB or an MgNB, and the base station 106A operates as a C-SgNB or an C-Sng-eNB.

In general, the wireless communication network 100 can include any suitable number of base stations supporting NR cells and/or EUTRA cells. More particularly, the EPC 111 or the 5GC 160 can be connected to any suitable number of base stations supporting NR cells and/or EUTRA cells. Although the examples below refer specifically to specific CN types (EPC, 5GC) and RAT types (5G NR and EUTRA), in general the techniques of this disclosure also can apply to other suitable radio access and/or core network technologies such as sixth generation (6G) radio access and/or 6G core network or 5G NR-6G DC.

With continued reference to FIG. 1, the base station 104 is equipped with processing hardware 130 that can include one or more general-purpose processors such as CPUs and non-transitory computer-readable memory storing machine-readable instructions executable on the one or more general-purpose processors, and/or special-purpose processing units. The processing hardware 130 in an example implementation includes a recovery controller 131 configured to support a procedure for recovering a radio connection of the UE 102 and an MN RRC controller 132 configured to manage or control one or more RRC configurations or RRC procedures when the base station 104 operates as an MN.

The base station 106A is equipped with processing hardware 140 that can also include one or more general-purpose processors such as CPUs and non-transitory computer-readable memory storing machine-readable instructions executable on the one or more general-purpose processors, and/or special-purpose processing units. The processing hardware 140 in an example implementation includes recovery controller 141 and an and an (C-)SN RRC controller 142 configured to manage or control one or more RRC configurations and/or RRC procedures when the base station 106A operates as an SN or a candidate SN (C-SN). The base station 106B can include hardware similar to the hardware of the base station 106A.

Although FIG. 1 illustrates the RRC controllers 132 and 142 as operating in an MN and an SN, respectively, a base station generally can operate as an MN, an SN or a candidate SN in different scenarios. Thus, the MN 104, the SN 104A, and the SN 106B can implement similar sets of functions and support both MN, SN and conditional SN operations.

Still referring to FIG. 1, the UE 102 is equipped with processing hardware 150 that can include one or more general-purpose processors such as CPUs and non-transitory computer-readable memory storing machine-readable instructions executable on the one or more general-purpose processors, and/or special-purpose processing units. The processing hardware 150 in an example implementation includes a recovery controller 151 configured to support a procedure for recovering a radio connection between the UE 102 and the MN 104 and a UE RRC controller 152 configured to manage or control one or more RRC configurations and/or RRC procedures.

Figure 2:
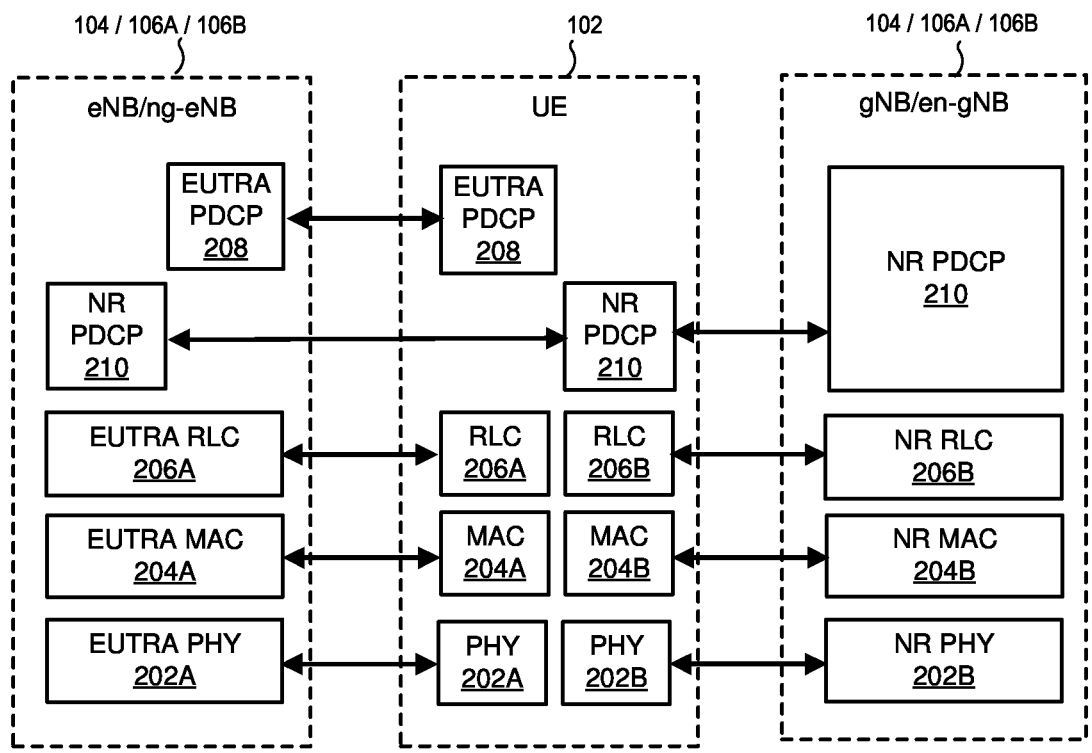
FIG. 2 is a block diagram of an example protocol stack according to which the UE of FIG. 1 communicates with base stations.

Next, FIG. 2 illustrates in a simplified manner a radio protocol stack according to which the UE 102 can communicate with an eNB/ng-eNB or a gNB. Each of the base stations 104, 106A, or 106B can be the eNB/ng-eNB or the gNB.

The physical layer (PHY) 202A of EUTRA provides transport channels to the EUTRA Medium Access Control (MAC) sublayer 204A, which in turn provides logical channels to the EUTRA Radio Link Control (RLC) sublayer 206A, and the EUTRA RLC sublayer in turn provides RLC channels to the EUTRA PDCP sublayer 208 and, in some cases, NR PDCP sublayer 210. Similarly, the PHY 202B of NR provides transport channels to the NR MAC sublayer 204B, which in turn provides logical channels to the NR RLC sublayer 206B, and the NR RLC sublayer 206B in turn provides RLC channels to the NR PDCP sublayer 210. The UE 102 in some implementations supports both the EUTRA and the NR stack, to support handover between EUTRA and NR base stations and/or DC over EUTRA and NR interfaces. Further, as illustrated in FIG. 2A, the UE 102 can support layering of NR PDCP 210 over EUTRA RLC 206A.

The EUTRA PDCP sublayer 208 and the NR PDCP sublayer 210 receive packets (e.g., from the Internet Protocol (IP) layer, layered directly or indirectly over the PDCP layer 208 or 210) that can be referred to as service data units (SDUs), and output packets (e.g., to the RLC layer 206A or 206B) that can be referred to as protocol data units (PDUs). Except where the difference between SDUs and PDUs is relevant, this disclosure for simplicity refers to both SDUs and PDUs as "packets."

On a control plane, the EUTRA PDCP sublayer 208 and the NR PDCP sublayer 210 provide SRBs to exchange Radio Resource Control (RRC) messages, for example. On a user plane, the EUTRA PDCP sublayer 208 and the NR PDCP sublayer 210 provide DRBs to support data exchange.

When the UE 102 operates in EUTRA/NR DC (EN-DC), with the BS 104A operating as a MeNB and the BS 106A operating as a SgNB, the network can provide the UE 102 with an MN-terminated bearer that uses EUTRA PDCP 208 or MN-terminated bearer that uses NR PDCP 210. The network in various scenarios also can provide the UE 102 with an SN-terminated bearer, which use only NR PDCP 210. The MN-terminated bearer can be an MCG bearer or a split bearer. The SN-terminated bearer can be a SCG bearer or a split bearer. The MN-terminated bearer can be an SRB (e.g., SRB1 or SRB2) or a DRB. The SN-terminated bearer can an SRB (e.g., SRB) or a DRB.

For clarity, known techniques for conditionally adding/changing an SN and performing a fast recovery of an MCG link are briefly considered below with reference to FIGS. 3 and 4. In the following description, "C-PSCell configuration" and "C-SN connection information can be interchangeably used.

Figure 3:
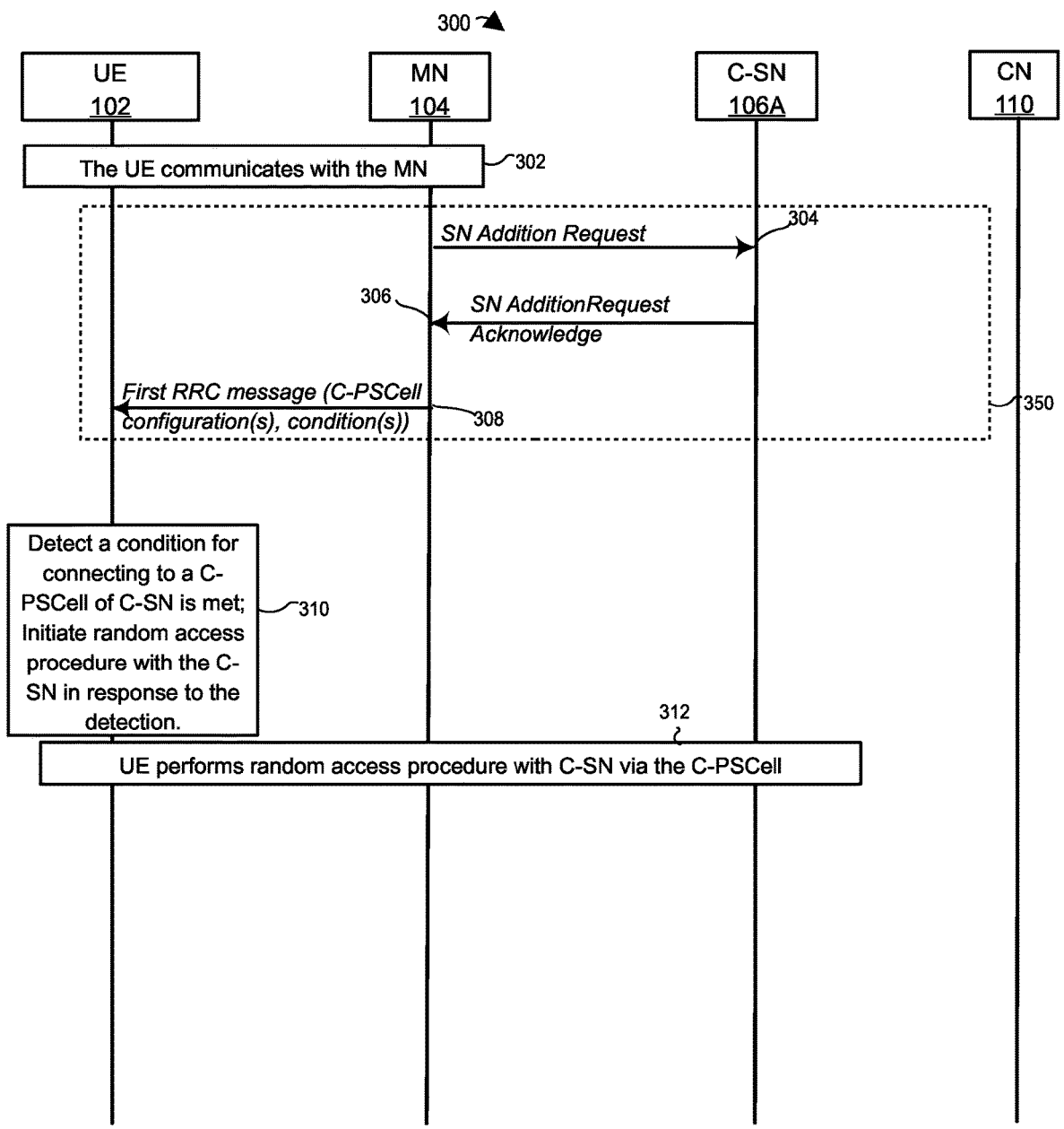
FIG. 3 is a messaging diagram of a scenario in which an MN conditionally adds a candidate SN (C-SN), according to a known technique.

Referring first to FIG. 3, the base station 104 in a scenario 300 operates as an MN, and the base station 106A operates as a C-SN. Initially, the UE 102 communicates 302 with the MN 104. In one scenario, the UE 102 in SC with the MN 104 communicates data (e.g., UL Data PDUs and/or DL Data PDUs) with MN 104. In another scenario, the UE 102 in DC with the MN 104 and the SN 106B communicates data (e.g., UL Data PDUs and/or DL Data PDUs) with the MN 104 and/or the SN 106B (not shown in FIG. 3). In yet another scenario, the UE 102 in DC with the MN 104 and the SN 106A communicates data (e.g., UL Data PDUs and/or DL Data PDUs) with the MN 104 and/or the SN 106B. The MN 104 can determine that it should initiate a first conditional SN Addition procedure to configure the base station 106A as a C-SN for the UE 102 or configure a cell of the base station 106A, which can be a C-SN or an SN, as a C-PSCell for the UE 102. The MN 104 can make this determination based on one or more measurement results received from the UE 102, for example, or another suitable event. In response to this determination, the MN 104 sends 304 an SN Addition Request message to the C-SN 106A to initiate a conditional SN Addition procedure. In response to receiving 304 the SN Addition Request message, the C-SN 106A includes a C-PSCell configuration in an SN Addition Request Acknowledge message for the UE 102. The SN 106A then sends 306 the SN Addition Request Acknowledge message to the MN 104, in response to the SN Addition Request message. The C-PSCell configuration included in this message can include one or more configuration parameters for a C-PSCell.

For convenience, the discussion below refers to the configuration in singular, but it will be understood that the C-SN 106A can provide multiple C-PSCell configurations where each includes one or more configuration parameters for a particular C-PSCell.

In some implementations, the MN 104 can include in the SN Addition Request message a request that the base station 106A operates as a C-SN for the UE 102. In other implementations, a specific request message instead of the SN Addition Request message can be defined and sent by the MN 104 to the base station 106A to request the base station 106A to operate as a C-SN for the UE 102. The C-SN 106 may send a specific request acknowledge message including the C-PSCell configuration instead of the SN Addition Request Acknowledge message.

In some implementations, the MN 104 can include C-SN connection information including the C-PSCell configuration and, in some cases, one or more conditions for connecting to the C-SN 106A via the C-PSCell, in a first RRC message. The information in the first RRC message can include one or more indicators or parameters such as a field name, a dedicated information element (IE), and/or an indication of the condition(s) associated with the C-PSCell configuration.

In some implementations, the C-PSCell configuration can include a group configuration (CellGroupConfig) IEs that configure the C-PSCell. In one implementation, the SN 106A may include an RRCReconfiguration message including the CellGroupConfig IE in the SN Addition Request Acknowledge message. The CellGroupConfig IE can conform to 3GPP TS 38.331.

In other implementations, the C-PSCell configuration can be a SCG-ConfigPartSCG-r12 IE configuring the C-PSCell. In one implementation, the SN 106A may include an RRC-ConnectionReconfiguration message including the ConfigPartSCG-r12 IE in the SN Addition Request Acknowledge message. In other implementations, the C-PSCell configuration can be an RRCConnectionReconfiguration message including the SCG-ConfigPartSCG-r12 IE. The SCG-ConfigPartSCG-r12 IE can conform to 3GPP TS 36.331.

With continued reference to FIG. 3, in response to receiving 306 the SN Addition Request Acknowledge message, the MN 104 includes the C-PSCell configuration and at least one condition in the first RRC message and transmits 308 the first RRC message to the UE 102. In some implementations, the UE 102 transmits a first RRC response message to the MN 104 in response to the first RRC message. In one example, the first RRC message can be an RRC Connection Reconfiguration message and the first RRC response message can be an RRC Connection Reconfiguration Complete message. In another example, the first RRC message can be an RRC Reconfiguration message and the first RRC response message can be an RRC Reconfiguration Complete message.

The events 304, 306, 308 collectively can be considered to define a conditional configuration procedure 350.

The UE 102 applies the received at least one condition (discussed below in singular for convenience) to determine whether to connect to the C-SN 106A via the C-PSCell. If the UE 102 determines that the condition is satisfied, the UE 102 connects to the C-SN 106A via the C-PSCell. If the UE 102 does not determine that the condition is satisfied, the UE 102 does not connect to the C-SN 106A via the C-PSCell.

Depending on the implementation, the UE 102 can connect to the C-SN 106 via the C-PSCell if one but necessarily all of the multiple conditions is satisfied, or the UE 102 can connect to the C-SN 106 only if every condition is satisfied.

When the UE 102 determines 310 that the condition for connecting to the C-PSCell is satisfied, the UE 102 initiates 310 a random access procedure via the C-PSCell with the C-SN 106A in response to the detection. The UE 102 performs 312 the random access procedure with the C-SN 106A via the C-PSCell. If the UE successfully completes the random access procedure, the C-SN 106A begins to operate as an SN to transmit data to the UE 102 and/or receive data from the UE 102.

If the base station 106A is an SN for the UE 102, an SN Modification Request message can be used by the MN 104 instead of the SN Addition Request message, and an SN Modification Request Acknowledge message can be used by the SN 106A instead of the SN Addition Request Acknowledge message.

Figure 4:
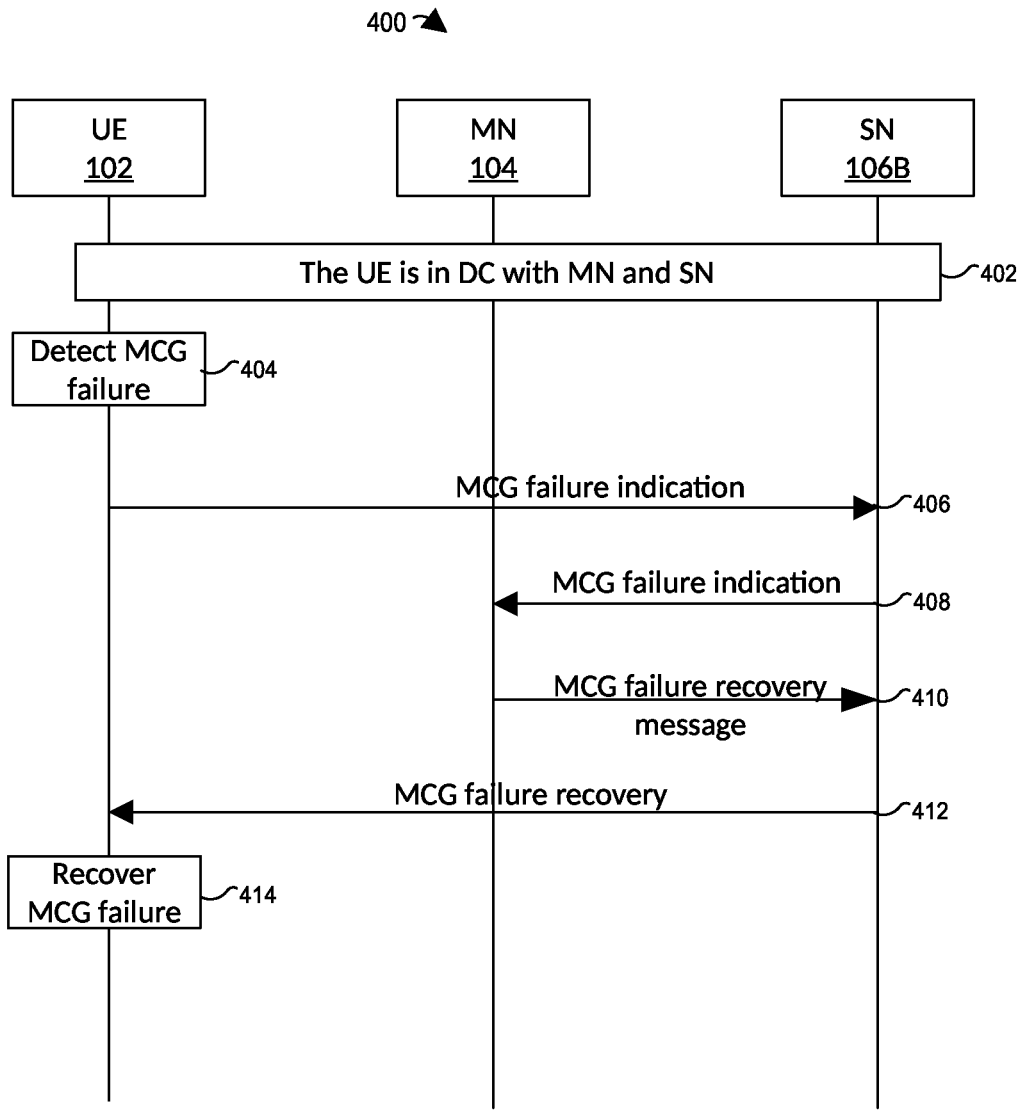
FIG. 4 is a messaging diagram of a scenario in which a UE, an MN, and an SN perform a known procedure for fast recovery of an MCG link.

Next, FIG. 4 illustrates a scenario 400 in which the base station 104 operates as an MN, and the base station 106B operates as an SN. At the beginning, the UE 102 is 402 in DC with the MN 104 and the SN 106B. The UE 102 detects 404 MCG failure. In response to the event 404, the UE 102 transmits 406 an MCG failure indication message to the SN 106B. The SN 106B sends 408 the MCG failure indication message to the MN 104. In response to receiving 408 the MCG failure indication message, the MN 104 generates an MCG failure recovery message for the UE 102 to recover the MCG failure the UE detected at event 404. The MN 104 sends 410 the MCG failure recovery message to the SN 106, and the SN 106 in turn sends 412 the MCG failure recovery message to the UE 102. The UE 102 recovers 414 the MCG failure in response to the MCG failure recovery message.

Figure 5:
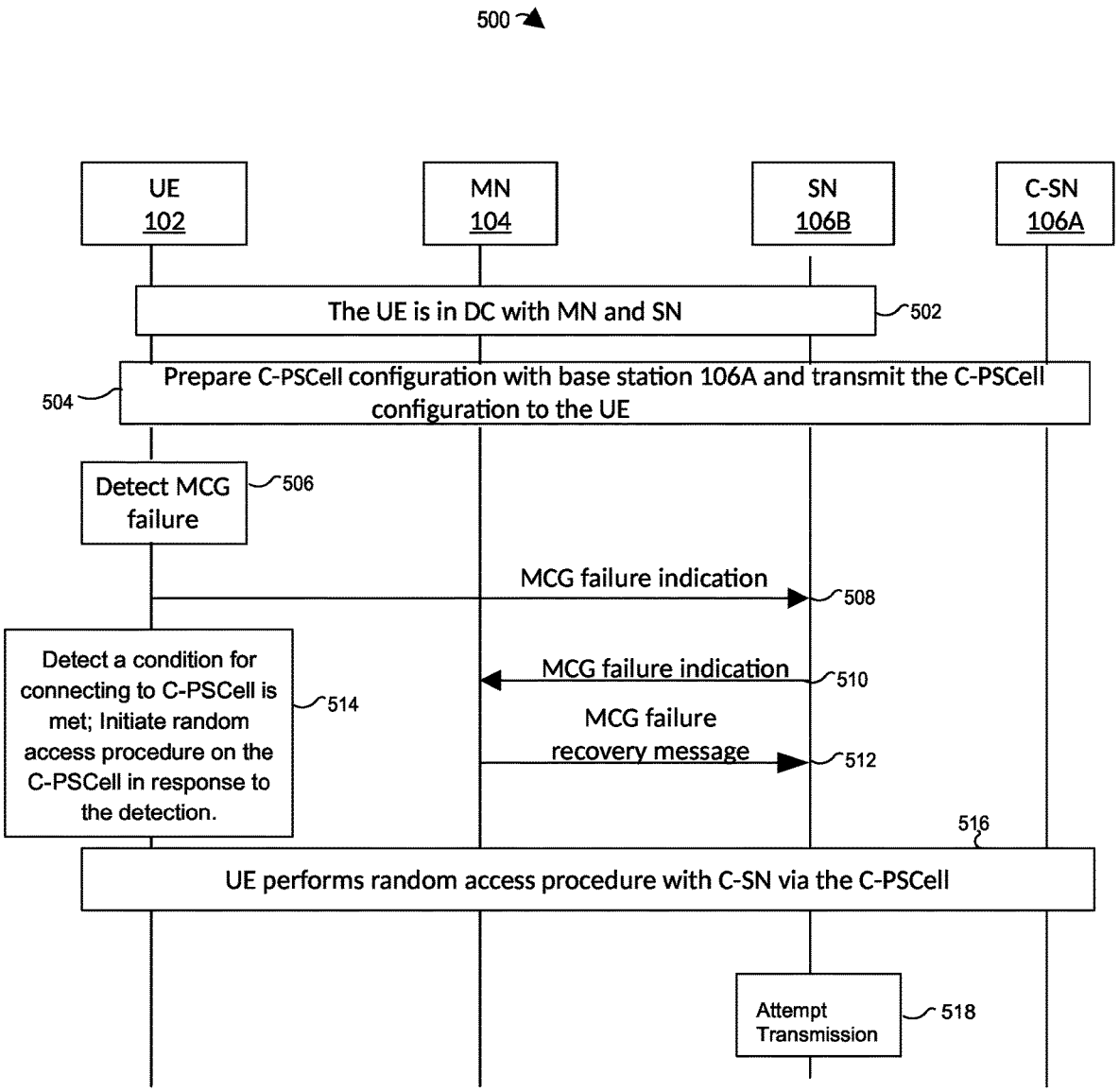
FIG. 5 is a messaging diagram of a scenario in which a UE detects that the condition for connecting to the C-SN is satisfied and attempts to connect to the C-SN while a procedure for fast recovery of the MCG link is in progress.

Next, prior to discussing some of the example techniques of this disclosure, an interaction between the procedures of FIGS. 3 and 4 is briefly considered in general terms with reference to FIG. 5.

In a scenario 500 of FIG. 5, the base station 104 operates as an MN, and the base station 106B operates as an SN. At the beginning of the scenario 500, the UE 102 is 502 in DC with the MN 104 and the SN 106B. The MN 104 determines that it should configure the base station 106A as a C-SN for the UE 102. The MN 104 accordingly performs 504 a conditional configuration procedure for a C-PSCell of the C-SN 106A, similar to the conditional configuration procedure 350 discussed with reference to FIG. 3.

At a later time, the UE 102 detects 506 MCG failure (e.g., a radio link failure in the MN). In response to the detection 506, the UE 102 transmits 508 a MCG failure indication to the SN 106B. After receiving 508 the MCG failure indication from the UE 102, the SN 106B sends 510 an MCG failure indication to the MN 104. In some implementations, the SN 106B sends the MN 104 an interface message including the MCG failure indication 508 or including a similar MCG indication indicating the MCG failure.

In response to receiving 510 the MCG failure indication, the MN 104 transmits 512 a MCG failure recovery message to the SN 106B to recover the MCG link. The SN 106B transmits 518 the MCG failure recovery message to the UE 102. Before the UE 102 receives 518 the MCG failure recovery message, the UE 102 detects 514 a condition for connecting to a C-PSCell is satisfied and initiates a random access procedure on the C-PSCell in response to the detection. In response to the event 514, the UE 102 disconnects from the SN 106B and performs 516 a random access procedure with the C-SN 106A via the C-PSCell according to the C-PSCell configuration.

However, because the UE 102 has already disconnected from the SN 106B, the UE 102 is no longer capable of receiving the MCG failure recovery message from the SN 106B, should the SN 106B attempt 518 a transmission to the UE 102 at this time. Thus, the UE 102 in this scenario is unable to recover the MCG link between UE 102 and MN 104 using the fast MCG recovery procedure.

Figure 6:
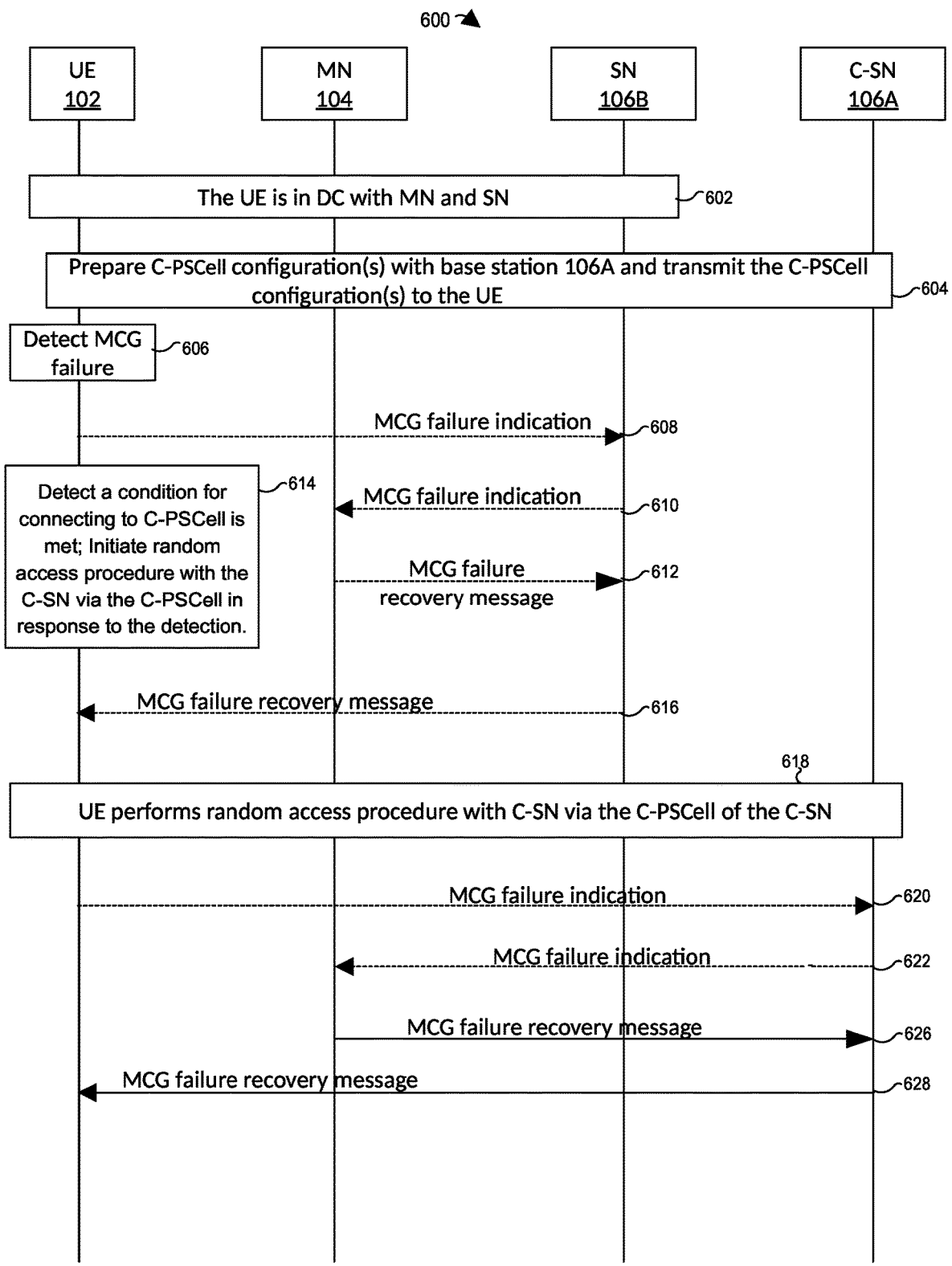
FIG. 6 is a messaging diagram of a scenario in which the UE of FIG. 1 sends an MCG failure indication to the SN as well as to the C-SN, according to one of the techniques of this disclosure.

Now referring to FIG. 6, the base station 104 in a scenario 600 operates as an MN, the base station 106B operates as an SN, and base station 106A operates as C-SN for the UE 102. At the beginning of a scenario 600, the UE 102 is in 602 DC with the MN 104 and the SN 106B. The MN 104 decides to configure base station 106A as a C-SN for the UE 102. In response to this decision, the MN 104 prepares 604 C-PSCell configuration procedure with C-SN 106A, similar to event 350.

At a later time, the UE 102 detects 606 MCG failure (e.g., a radio link failure). In response to this detection 606, the UE 102 transmits 608 an MCG failure indication to the SN106B. If the SN 106B receives 608 the MCG failure indication from the UE 102, the SN 106B sends a 610 MCG failure indication to the MN 104. In some implementations of event 610, the SN 106B sends to the MN 104 an interface message including the MCG failure indication 608 or a similar MCG indication to notify the MN 104 of the MCG failure. In response to the 610 MCG failure indication, the MN 104 can transmit 612 an MCG failure recovery message to the SN 106B, so as to recover the MCG link between the UE 102 and the MN 104. Then, the SN 106B can transmit 616 the MCG failure recovery message (received from the MN 104 at event 612) to the UE 102.

In some scenarios, the UE 102 can detect 614 a condition for connecting to a C-PSCell of the C-SN 106A is satisfied after the UE 102 detects 606 the MCG failure. In response to the event 614, the UE 102 disconnects from the SN 106B and performs a 618 random access procedure with the C-SN 106A via the C-PSCell.

In some cases, the UE 102 may not be able to transmit 608 the MCG failure indication successfully, and the SN 106B in turn may not transmit 610 the MCG indication. Consequently, the MN 104 does not transmit 616 the MCG failure recovery message. In other cases, the UE 102 may detect 614 a condition for connecting to a C-PSCell of the C-SN 106A is satisfied before the UE 102 detects 606 the MCG failure. In response to the event 614, the UE 102 disconnects from the SN 106B and performs 618 a random access procedure with the C-SN 106A via the C-PSCell. In these scenarios, the UE 102 also may not be able to transmit 608 the MCG failure indication successfully, which in turn prevents the events 610 and 616 from occurring as discussed above.

In response to the event 614, the UE 102 disconnects from the SN 106B and performs 616 a random access procedure with the C-SN 106A via the C-PSCell according to the C-PSCell configuration. The UE 102 can transmit 620 an MCG failure indication to C-SN 106A via the C-PSCell during the random access procedure or after completing the random access procedure. The C-SN 106A can send 622 to the MN 104 an MCG failure indication to indicate the MCG failure (this indication can be the MCG failure indication received at the event 602 or a similar MCG failure indication). The MN 104 then sends 626 a MCG failure recovery message to the C-SN 106A, and the C-SN 106A transmits 628 the MCG failure recovery message to the UE 102.

The UE 102 can discard or otherwise ignore the MCG failure recovery message (event 628) if the UE 102 has received 616 the MCG failure recovery message and received 628 the MCG failure recovery message. The UE 102 can recover the MCG link according to the 616 MCG failure recovery message. Further, the UE 102 can recover the MCG link according to the 628 MCG failure recovery message if the UE 102 has not received 616 the MCG failure recovery message but has received 628 the MCG failure recovery message.

In one scenario, the UE 102 does not receive 616 the MCG failure recovery message from the SN 106B because the UE 102 has already disconnected from the SN 106B to perform 618 the random access procedure. In this case, the UE 102 transmits 620 the MCG failure indication to the C-SN 106A during or after the 618 random access procedure with the C-SN 106A via the C-PSCell.

In another scenario, the UE 102 receives 616 the MCG failure recovery message before the UE 102 disconnects from the SN 106B. The UE 102 in this case can omit sending 620 the MCG failure indication to the C-SN 106A.

In yet another embodiment, if the UE 102 does not successfully transmit 608 the MCG failure indication before the UE 102 disconnects from the SN 106B, the UE 102 transmits 620 the MCG failure indication. In one implementation, the UE 102 may determine to not transmit 608 the MCG failure indication if the UE 102 has not received from the MN 104 a lower-layer acknowledgement indicating that the MN 104 has received 608 the MCG failure indication.

Figure 7:
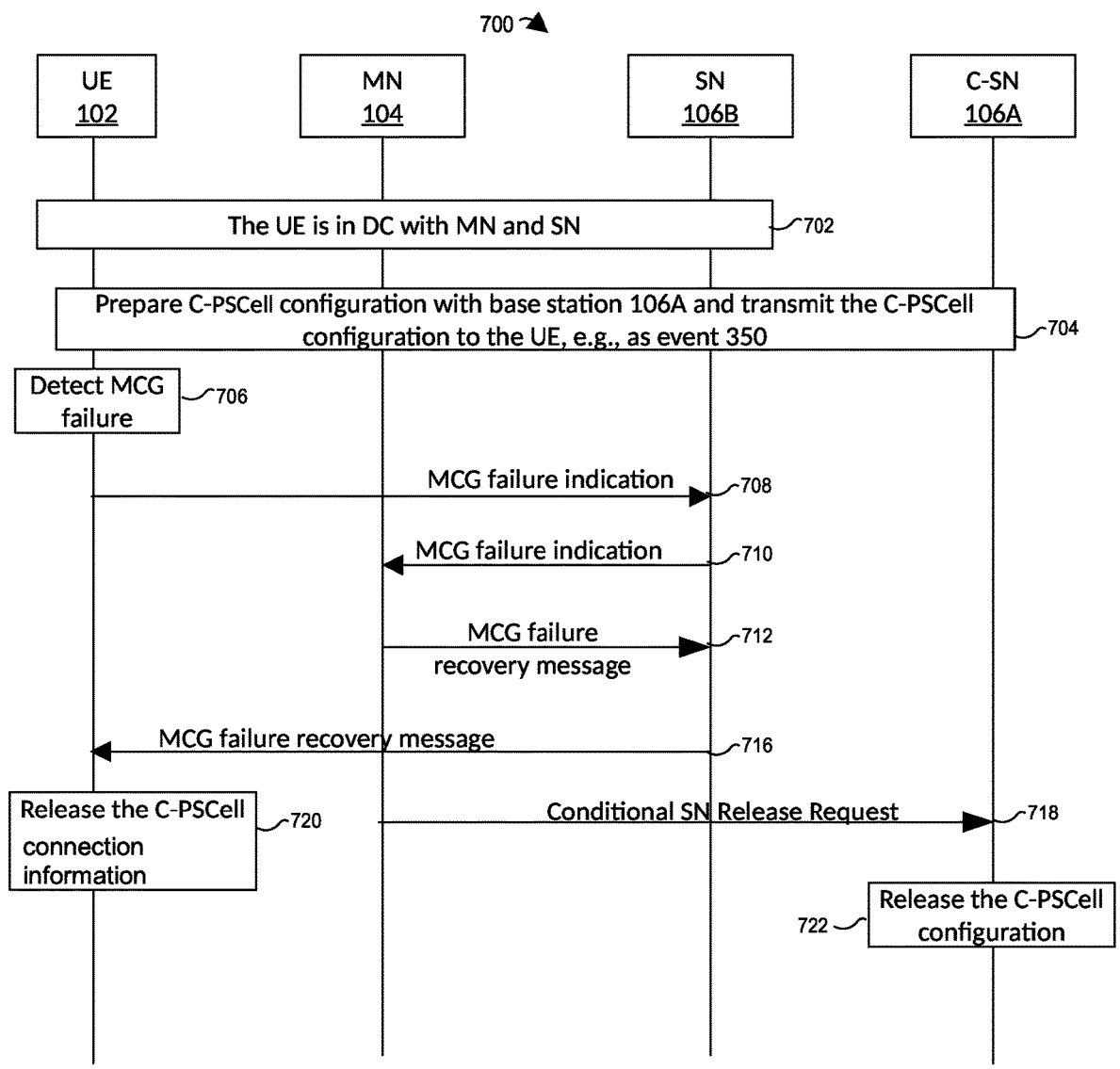
FIG. 7 is a messaging diagram of a scenario in which the UE of FIG. 1 releases the candidate primary secondary cell (C-PSCell) configuration upon receiving an MCG failure recovery message, according to one of the techniques of this disclosure.

Next, FIG. 7 illustrates a scenario 700 in which the base station 104 operates as an MN, the base station 106B operates as an SN, and the base station 106A operates as C-SN for the UE 102. At the beginning of a scenario 700, the UE 102 is in 702 DC with the MN 104 and the SN 106B. The MN 104 decides to configure base station 106A as a C-SN for the UE 102. In response to this decision, the MN 104 prepares 704 a C-PSCell configuration with C-SN 106A and transmits the C-PSCell configuration to the UE 102, similar to event 350.

At a later time, the UE 102 detects 706 MCG failure (e.g., a radio link failure). In response to this detection 706, the UE 102 transmits 708 a MCG failure indication to the SN 106B. If the SN 106B receives 708 the MCG failure indication from the UE 102, the SN 106B sends 710 an MCG failure indication to the MN 104. In some implementations of the event 710, the SN 106B sends to the MN 104 an interface message including the MCG failure indication 708 or including a similar MCG indication that indicates the MCG failure. In response to the 710 MCG failure indication, the MN 104 can transmit 712 an MCG failure recovery message to the SN 106B to recover the MCG link between the UE 102 and the MN 104. The SN 106B then can transmit 716 the MCG failure recovery message (received from the MN 104 at event 712) to the UE 102. In response to receiving 710 the MCG failure indication, the MN 104 can send 718 a Conditional SN Release Request message to the C-SN 106A to request the C-SN 106A to release the C-PSCell configuration. In response to the Conditional SN Release Request message, the C-SN 106A releases 722 the C-PSCell configuration. Further, in response to the 716 MCG failure recovery message, the UE 102 releases 720 the C-PSCell configuration and/or the condition to prevent the UE 102 from disconnecting from the SN 106B. In some implementations, the MN 104 may indicate to the UE 102 to release the C-PSCell configuration in the MCG failure recovery message 716.

Figure 8A:
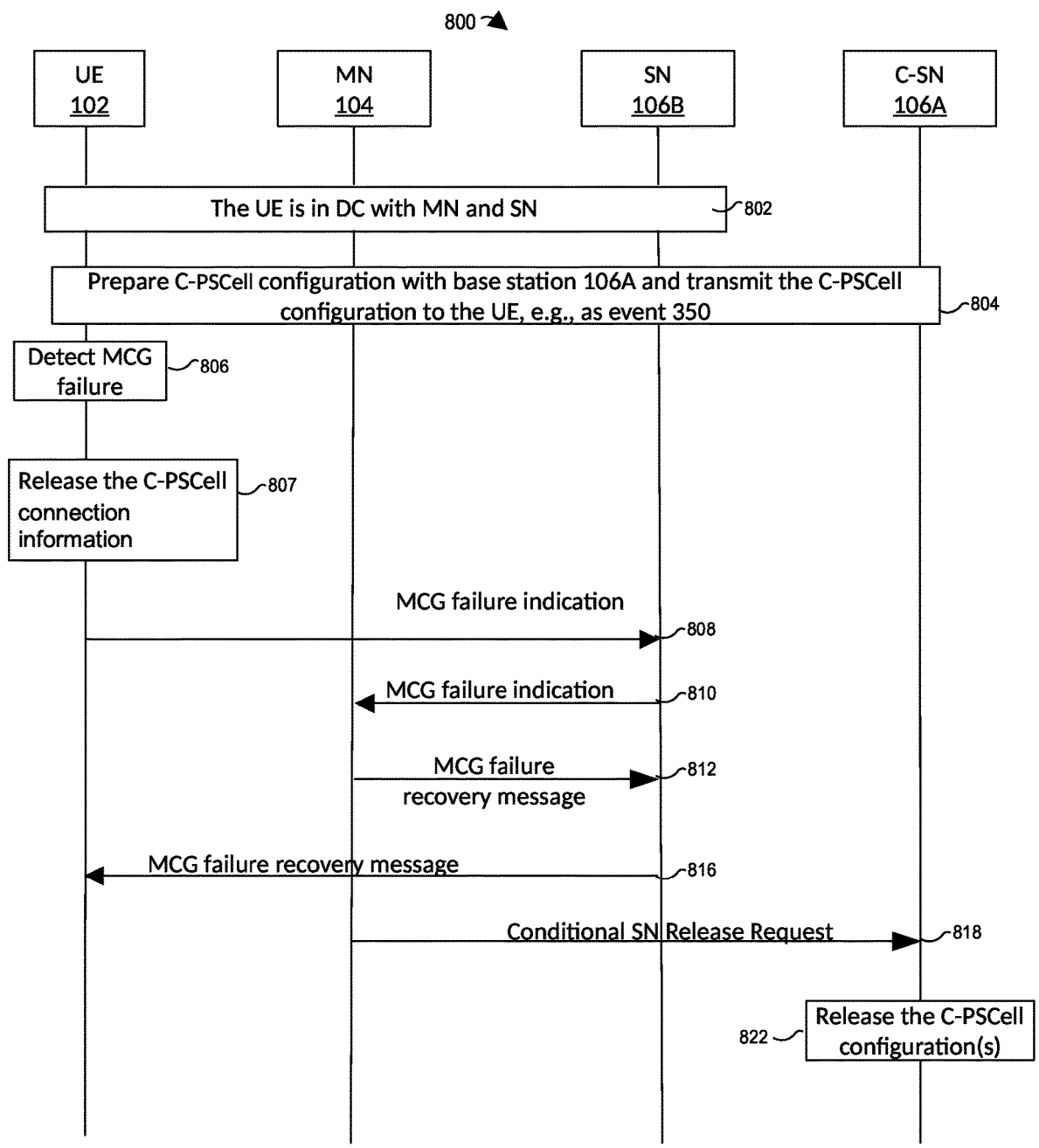
FIG. 8A is a messaging diagram of a scenario in which the UE of FIG. 1 releases the candidate primary secondary cell (C-PSCell) configuration prior to sending an MCG failure indication to the SN, according to one of the techniques of this disclosure.

Next, FIG. 8A illustrates a scenario 800 in which the base station 104 operates as an MN, the base station 106B operates as an SN, and the base station 106A operates as C-SN for the UE 102. At the beginning of a scenario 800, the UE 102 is in 802 DC with the MN 104 and the SN 106B. The MN 104 decides to configure base station 106A as a C-SN for the UE 102. In response to this decision, the MN 104 prepares 804 a C-PSCell configuration with C-SN 106A and transmits the C-PSCell configuration to the UE 102, similar to event 350.

The UE 102 at a later time detects 806 MCG failure (e.g., a radio link failure). In response to this detection 806, the UE 102 transmits 808 a first MCG failure indication to the SN 106B and releases 807 the C-PSCell configuration and/or the condition to prevent the UE 102 from disconnecting from the SN 106B. If the SN 106B receives 808 the first MCG failure indication from the UE 102, the SN 106B sends 810 an MCG failure indication to the MN 104. In some implementations of event 810, the SN 106B sends the MN 104 an interface message including the first MCG failure indication 808 or including a similar MCG indication indicating the MCG failure. In response to receiving 810 the MCG failure indication, the MN 104 may transmit 812 an MCG failure recovery message to the SN 106B to recover the MCG link between the UE 102 and the MN 104. Then, the SN 106B may transmit 816 the MCG failure recovery message (received from the MN 104 at event 812) to the UE 102. In response to receiving 810 the MCG failure indication, the MN 104 may send 818 a Conditional SN Release Request message to the C-SN 106A to request the C-SN 106A to release the C-PSCell configuration. In response to the Conditional SN Release Request message, the C-SN 106A releases 822 the C-PSCell configuration.

Figure 8B:
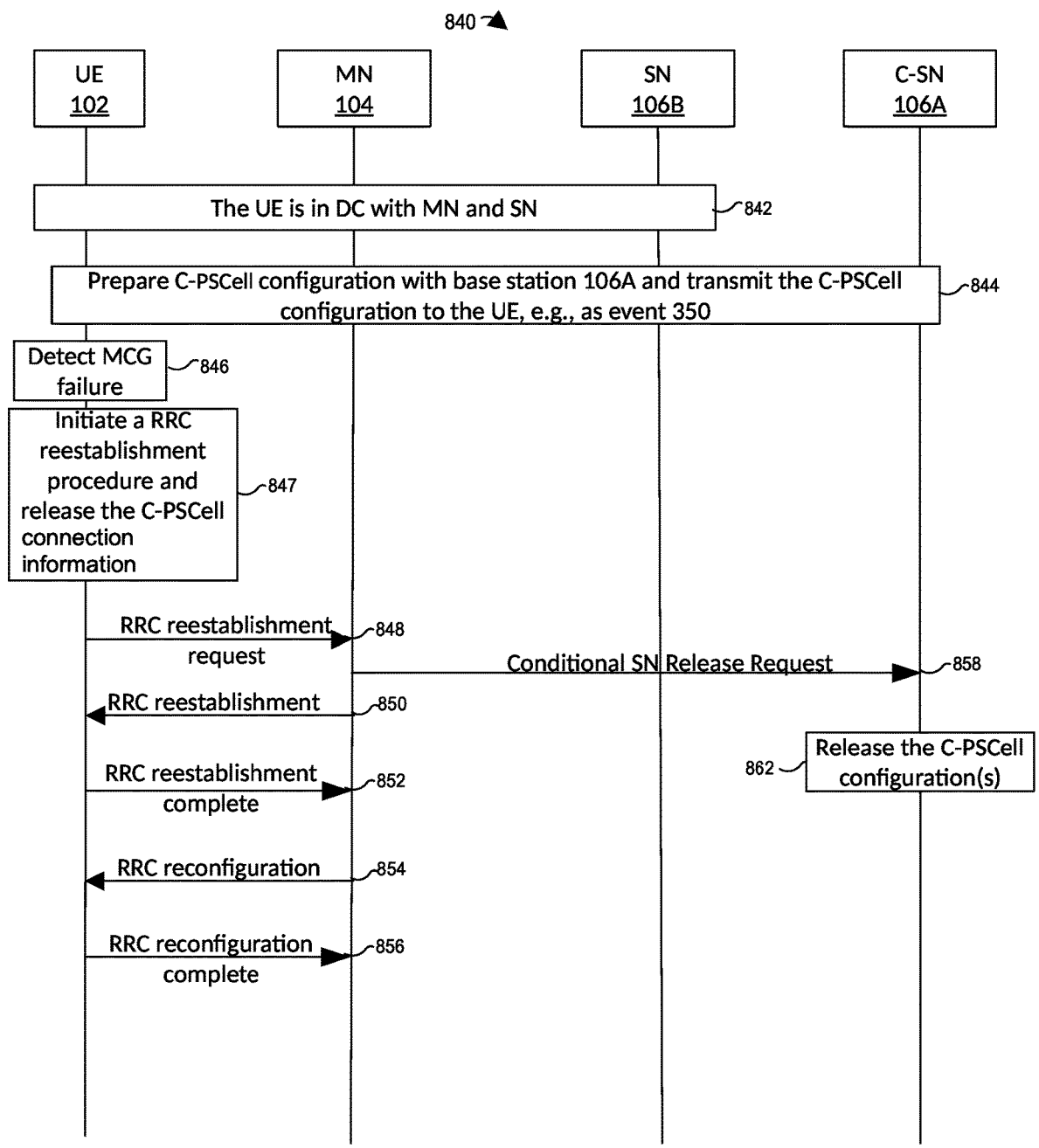
FIG. 8B is a messaging diagram of a scenario in which the UE of FIG. 1 initiates an RRC reestablishment procedure with the MN upon detecting MCG failure, and the MN sends a conditional SN release request to the C-SN, according to one of the techniques of this disclosure.

Next, FIG. 8B illustrates a scenario 840 in which the base station 104 operates as an MN, the base station 106B operates as an SN, and the base station 106A operates as C-SN for the UE 102. At the beginning of a scenario 840, the UE 102 is in 842 DC with the MN 104 and the SN 106B. The MN 104 decides to configure base station 106A as a C-SN for the UE 102. In response to this decision, the MN 104 prepares 844 a C-PSCell configuration with C-SN 106A and transmits the C-PSCell configuration to the UE 102, similar to event 350.

Later on, the UE 102 detects 846 MCG failure (e.g., a radio link failure). In response to this detection 846, the UE 102 initiates 847 an RRC reestablishment procedure via a cell of the MN 104. The UE 102 releases 847 the C-PSCell connection information in response to the detection 846 or the initiation 847. In the RRC reestablishment procedure, the UE 102 transmits 848 an RRC reestablishment request message to the MN 104. In response, the MN 104 transmits 850 an RRC reestablishment message to the UE 102. In response to the RRC reestablishment message, the UE 102 transmits 852 an RRC reestablishment complete message to the MN 104. In response to the RRC reestablishment procedure (e.g., receiving the RRC reestablishment request message 848, transmitting the RRC reestablishment 850, receiving the RRC reestablishment complete message 852), the MN 104 may send 858 a Conditional SN Release Request message to the C-SN 106A to request the C-SN 106A to release the C-PSCell configuration. In response to the Conditional SN Release Request message, the C-SN 106A releases 862 the C-PSCell configuration. The MN 104 may transmit 854 an RRC reconfiguration message to the UE 102 in response to the RRC reestablishment procedure (e.g., receiving the RRC reestablishment request message 848, transmitting the RRC reestablishment 850, receiving the RRC reestablishment complete message 852). The MN 104 may transmit 854 the RRC reconfiguration message to the UE 102 after transmitting the RRC reestablishment message or receiving the RRC reestablishment complete message. The UE 102 may transmit 856 an RRC reconfiguration complete message to the MN 104108 in response to the RRC reconfiguration message 854. Alternatively, the MN 104 may send 858 a Conditional SN Release Request message to the C-SN 106A to request the C-SN 106A to release the C-PSCell configuration in response to transmitting 854 the RRC reconfiguration message or receiving 856 the RRC reconfiguration complete message.

In some implementations, the UE 102 may initiate 847 the RRC reestablishment procedure with base station 108 (not shown in FIG. 1) instead of the MN 104 via a cell of the base station 108. In this case, the UE 102 transmits 848 an RRC reestablishment request message to the base station 108. In response, the base station 104 transmits 850 an RRC reestablishment message to the UE 102. In response to the RRC reestablishment message, the UE 102 transmits 852 an RRC reestablishment complete message to the base station 104. In response to the RRC reestablishment procedure (e.g., receiving the RRC reestablishment request message 848, transmitting the RRC reestablishment 850, receiving the RRC reestablishment complete message 852), the base station 108 may send an interface message (e.g., X2/Xn interface message such as a Context Release message) to the MN 104 to request the MN 104 to release a UE context of the UE 102. In response to the interface message, the MN 104 may send 858 a Conditional SN Release Request message to the C-SN 106A to request the C-SN 106A to release the C-PSCell configuration. In response to the Conditional SN Release Request message, the C-SN 106A releases 862 the C-PSCell configuration. The base station 108 may transmit 854 an RRC reconfiguration message to the UE 102 in response to the RRC reestablishment procedure (e.g., receiving the RRC reestablishment request message 848, transmitting the RRC reestablishment 850, receiving the RRC reestablishment complete message 852). The base station 108 may transmit 854 the RRC reconfiguration message to the UE 102 after transmitting the RRC reestablishment message or receiving the RRC reestablishment complete message. The UE 102 may transmit 856 an RRC reconfiguration complete message to the base station 108 in response to the RRC reconfiguration message 854.

Figure 8C:
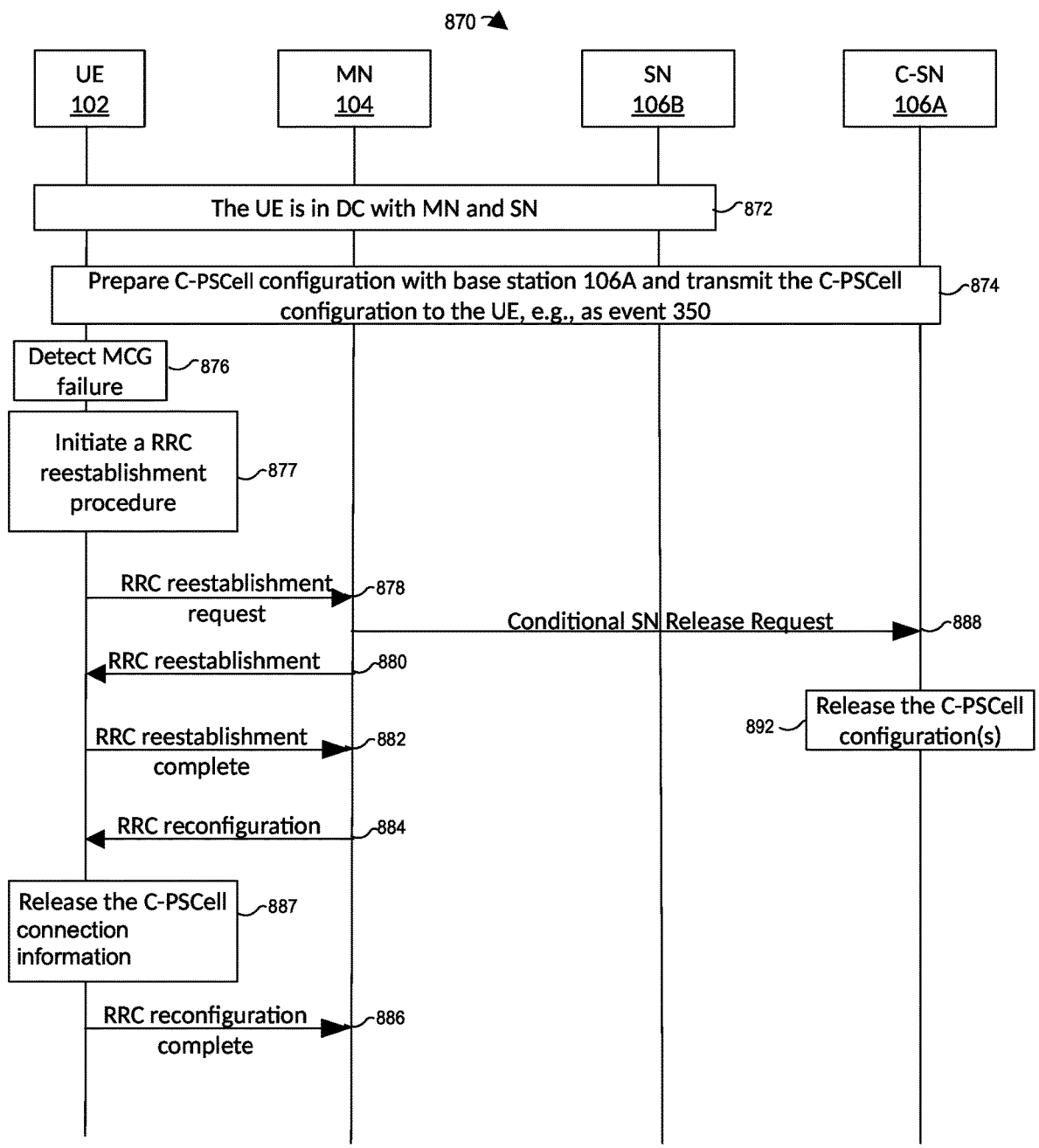
FIG. 8C is a messaging diagram of a scenario in which the UE of FIG. 1 initiates an RRC reestablishment procedure with the MN upon detecting MCG failure and subsequently releases the C-PSCell configuration, and the MN sends a conditional SN release request to the C-SN, according to one of the techniques of this disclosure.

Next, FIG. 8C illustrates a scenario 870 in which the base station 104 operates as an MN, the base station 106B operates as an SN, and the base station 106A operates as C-SN for the UE 102. At the beginning of a scenario 870, the UE 102 is in 872 DC with the MN 104 and the SN 106B. The MN 104 decides to configure base station 106A as a C-SN for the UE 102. In response to this decision, the MN 104 prepares 874 a C-PSCell configuration with C-SN 106A and transmits the C-PSCell configuration to the UE 102, similar to event 350.

Later on, the UE 102 detects 876 MCG failure (e.g., a radio link failure). In response to this detection 876, the UE 102 initiates 877 an RRC reestablishment procedure via a cell of the MN 104. In the RRC reestablishment procedure, the UE 102 transmits 878 an RRC reestablishment request message to the MN 104. In response, the MN 104 transmits 880 an RRC reestablishment message to the UE 102. In response to the RRC reestablishment message, the UE 102 transmits 882 an RRC reestablishment complete message to the MN 104. In response to the RRC reestablishment procedure (e.g., receiving the RRC reestablishment request message 878, transmitting the RRC reestablishment 880, receiving the RRC reestablishment complete message 882), the MN 104 may send 888 a Conditional SN Release Request message to the C-SN 106A to request the C-SN 106A to release the C-PSCell configuration. In response to the Conditional SN Release Request message, the C-SN 106A releases 892 the C-PSCell configuration. The MN 104 may transmit 884 an RRC reconfiguration message to the UE 102 in response to the RRC reestablishment procedure (e.g., receiving the RRC reestablishment request message 878, transmitting the RRC reestablishment 880, receiving the RRC reestablishment complete message 882). In response to the RRC reconfiguration message 884, the UE 102 releases 887 the C-PSCell configuration and/or the condition. The MN 104 may transmit 884 the RRC reconfiguration message to the UE 102 after transmitting 880 the RRC reestablishment message or receiving 882 the RRC reestablishment complete message. The UE 102 may release 887 the C-PSCell configuration and/or condition and transmit 886 an RRC reconfiguration complete message to the MN 104 in response to the RRC reconfiguration message 884. Alternatively, the MN 104 may send 888 a Conditional SN Release Request message to the C-SN 106A to request the C-SN 106A to release the C-PSCell configuration in response to transmitting 884 the RRC reconfiguration message or receiving 886 the RRC reconfiguration complete message.

In some implementations, the UE 102 may initiate 877 the RRC reestablishment procedure with base station 108 (not shown in FIG. 1) instead of the MN 104 via a cell of the base station 108. In this case, the UE 102 transmits 878 an RRC reestablishment request message to the base station 108. In response, the base station 104 transmits 880 an RRC reestablishment message to the UE 102. In response to the RRC reestablishment message, the UE 102 transmits 882 an RRC reestablishment complete message to the base station 104. In response to the RRC reestablishment procedure (e.g., receiving the RRC reestablishment request message 878, transmitting the RRC reestablishment 880, receiving the RRC reestablishment complete message 882), the base station 108 may send an interface message (e.g., X2/Xn interface message such as a Context Release message) to the MN 104 to request the MN 104 to release a UE context of the UE 102. In response to the interface message, the MN 104 may send 888 a Conditional SN Release Request message to the C-SN 106A to request the C-SN 106A to release the C-PSCell configuration. In response to the Conditional SN Release Request message, the C-SN 106A releases 892 the C-PSCell configuration. The base station 108 may transmit 854 an RRC reconfiguration message to the UE 102 in response to the RRC reestablishment procedure (e.g., receiving the RRC reestablishment request message 878, transmitting the RRC reestablishment 880, receiving the RRC reestablishment complete message 882). The base station 108 may transmit 884 the RRC reconfiguration message to the UE 102 after transmitting the RRC reestablishment message or receiving the RRC reestablishment complete message. The UE 102 may release 887 the C-PSCell configuration and/or condition and transmit 886 an RRC reconfiguration complete message to the base station 108 in response to the RRC reconfiguration message 884.

In some implementations, the RRC reconfiguration message 884 indicates release of the C-PSCell configuration and/or the condition. The UE 102 may release the C-PSCell configuration and/or the condition in response to the indication. In other implementations, the RRC reconfiguration message 884 does not indicate release of the C-PSCell configuration and/or the condition. The UE 102 may release the C-PSCell configuration and/or the condition in response to the RRC reconfiguration message 884. In further implementations, the RRC reconfiguration message 884 includes a full configuration indication. The UE 102 may release the C-PSCell configuration and/or the condition in response to the full configuration indication.

Figure 9:
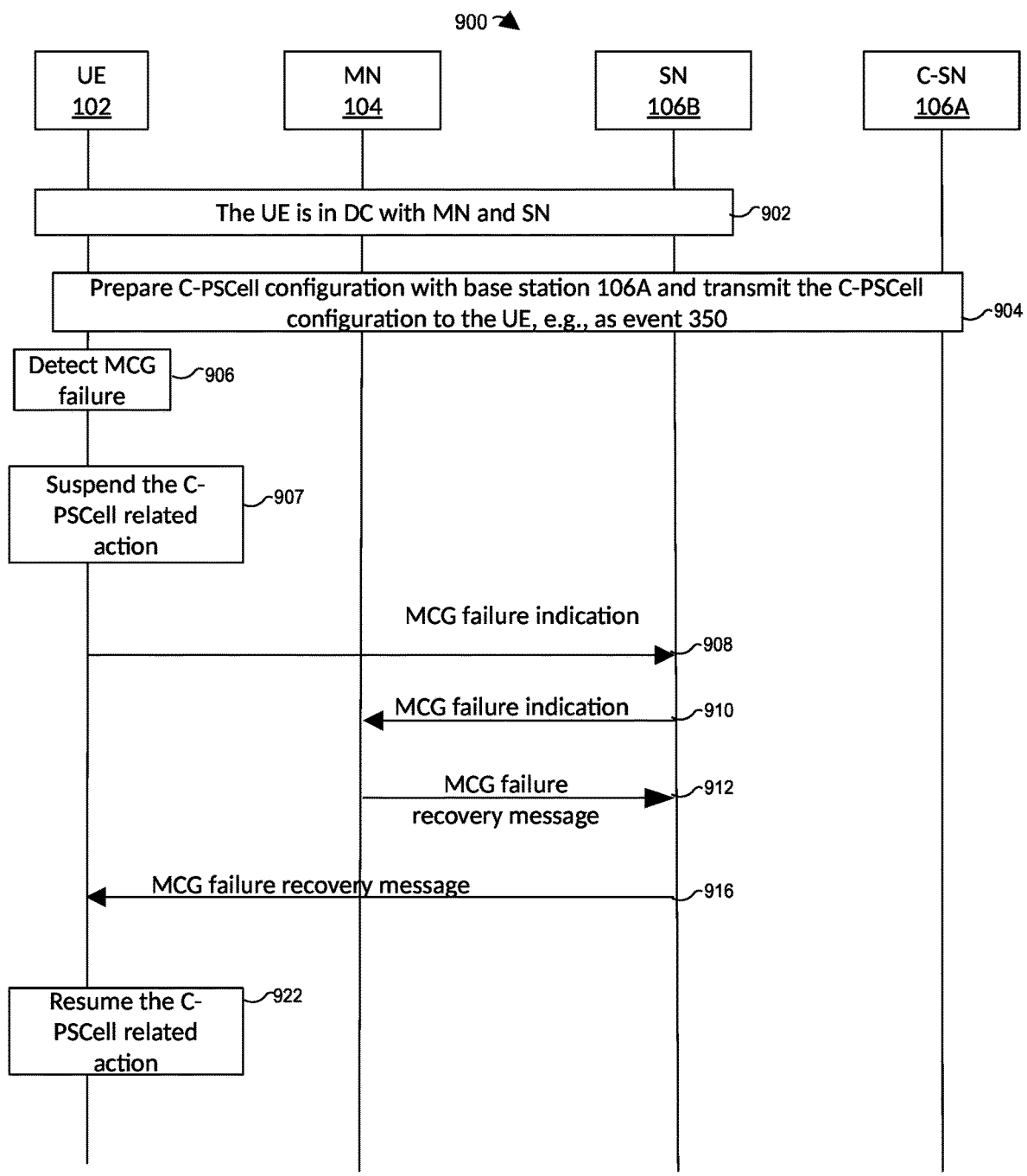
FIG. 9 is a messaging diagram of a scenario in which the UE of FIG. 1 suspends a conditional procedure related to the C-SN while the procedure for fast recovery of the MCG link is in progress, according to one of the techniques of this disclosure.

Next, FIG. 9 illustrates a scenario 900 in which the base station 104 operates as an MN, the base station 106B operates as an SN, and the base station 106A operates as C-SN for the UE 102. At the beginning of a scenario 900, the UE 102 is in 902 DC with the MN 104 and the SN 106B. The MN 104 decides to configure base station 106A as a C-SN for the UE 102. In response to this decision, the MN 104 prepares 904 a C-PSCell configuration with C-SN 106A and transmits the C-PSCell configuration to the UE 102, similar to event 350.

Later on, the UE 102 detects 906 MCG failure (e.g., a radio link failure). In response to this detection 906, the UE 102 transmits 908 a MCG failure indication to the SN 106B and suspends (or stops) 907 the C-PSCell related action(s). If the SN 106B receives 908 the MCG failure indication from the UE 102, the SN 106B sends a 910 MCG failure indication to the MN 104. In some implementations of event 910, the SN 106B sends the MN 104 an interface message including the MCG failure indication 908 or including a similar MCG indication indicating the MCG failure. In response to the 910 MCG failure indication, the MN 104 may transmit a 912 MCG failure recovery message to the SN 106B to recover the MCG link between the UE 102 and the MN 104. Then, the SN 106B may transmit 916 the MCG failure recovery message (received from the MN 104 at event 912) to the UE 102. The UE 102 recovers the MCG link according to the MCG failure recovery message. After the UE recovers the MCG link, the UE 102 resumes (or starts) the C-PSCell related action(s).

In some implementations, the C-PSCell related action(s) includes at least one of performing measurements on a carrier frequency of the C-PSCell, evaluating condition(s) for connecting to the C-PSCell, or disconnecting from the SN 106B and connecting to the C-PSCell. Thus, the UE 102 does not connect to the C-PSCell and still remains the connection with the SN 106B if the UE 102 suspends the C-PSCell related action(s).

After the UE 102 resumes (or starts) the C-PSCell related action(s), the UE 102 may detect a condition for connecting to the C-PSCell is met and initiate a random access procedure on the C-PSCell in response to the detection. The UE 102 disconnects from the SN 106B and performs the random access procedure on the C-PSCell in response to the initiation. If the UE 102 successfully completes the random access procedure, the C-SN 106A becomes SN 106A and the UE 102 communicates data with the SN 106A.

Figure 10:
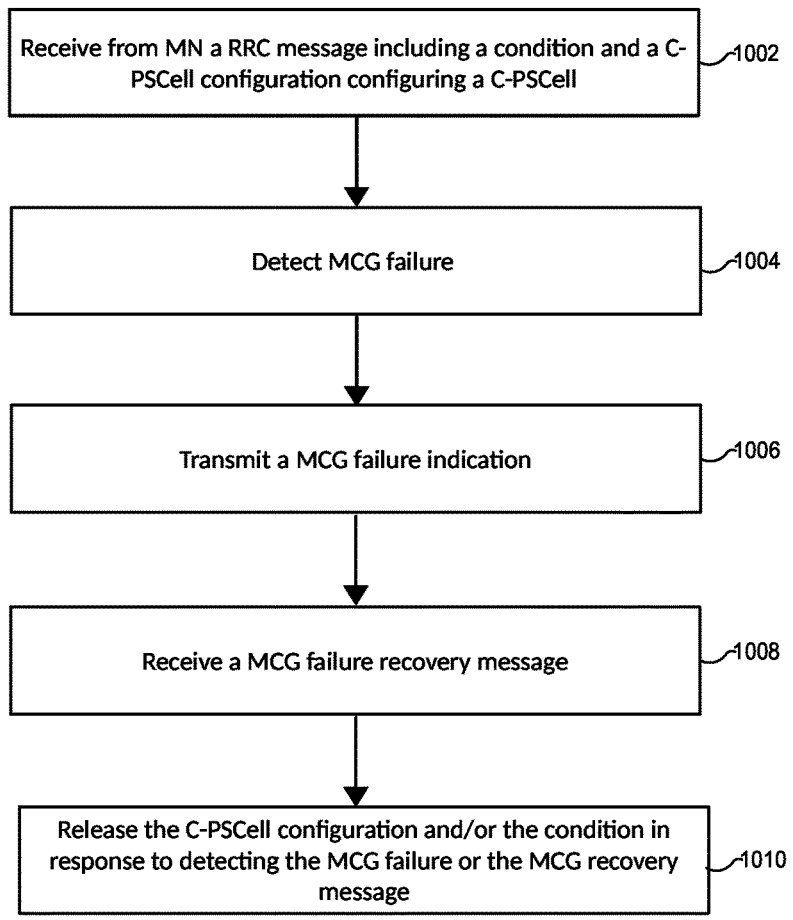
FIG. 10 is a flow diagram of an example method that includes releasing the C-PSCell configuration subsequent to receiving an MCG failure recovery message, which can be implemented in the UE of FIG. 1.

Next, FIG. 10 illustrates an example method 1000 for managing MCG failure while the UE in DC with an MN and an SN is configured a C-PSCell, which can be implemented in the UE 102, for example.

The method 1000 starts at block 1002, where the UE receives a first message from the MN (evet 308, 704, 804). The first message includes a condition and a C-PSCell configuration configuring a C-PSCell. The UE disconnects from the SN 106B and connects to the C-PSCell if the UE detects the condition is satisfied. At block 1004, the UE detects MCG failure (event 706, 806). Next, at block 1006, the UE transmits a MCG failure indication to indicate the MCG failure (event 708, 808). At block 1008, the UE receives a MCG failure recovery message (event 716, 816). The UE releases the C-PSCell configuration and/or the condition in response to detecting 1004 the MCG failure or receiving 1008 the MCG failure recovery message.

Figure 11:
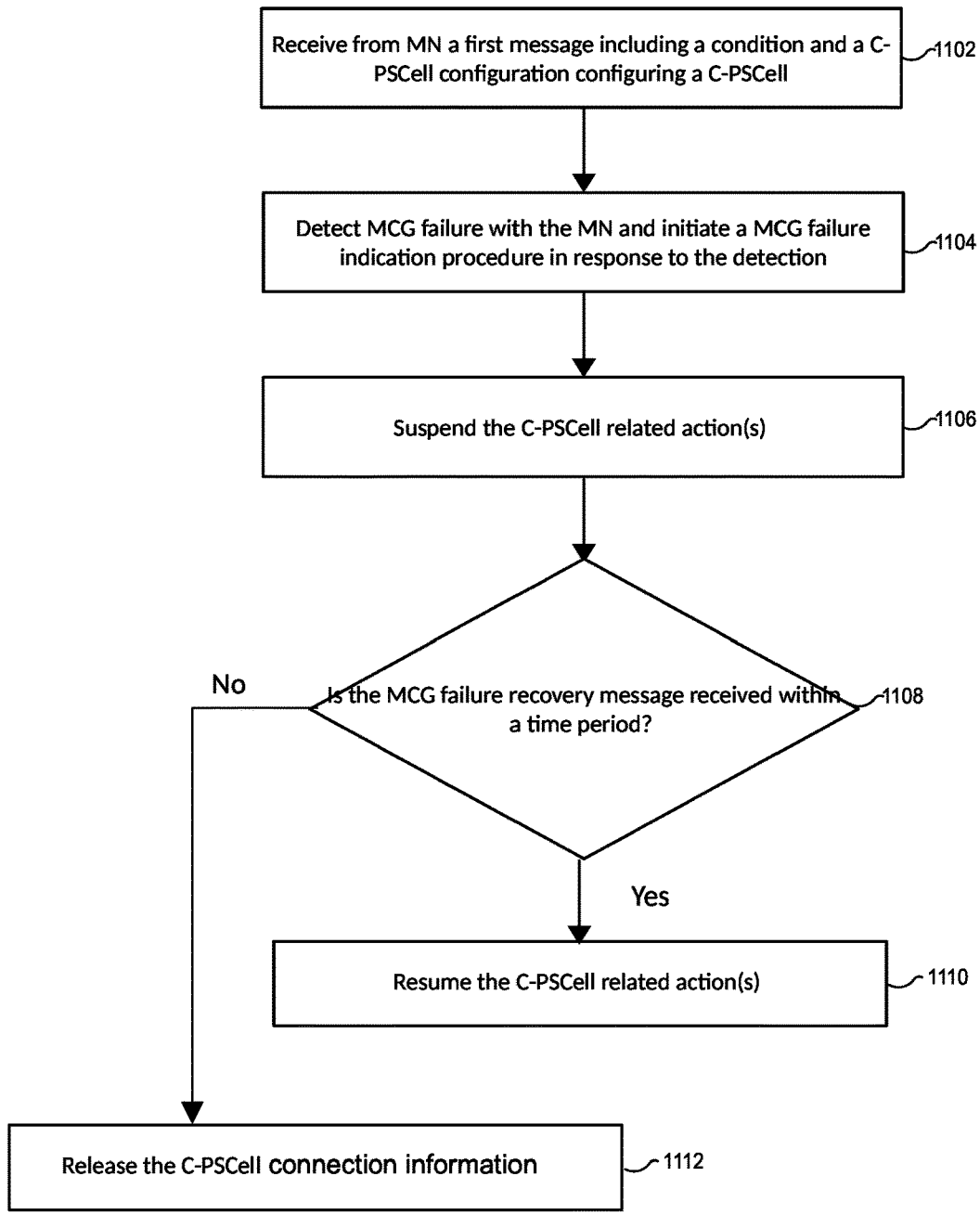
FIG. 11 is a flow diagram of an example method that includes suspending a conditional procedure related to the C-PSCell while a procedure for fast failure recovery of the MCG link is in progress, which can be implemented in the UE of FIG. 1.

Next, FIG. 11 illustrates an example method 1100 for managing MCG failure while the UE in DC with an MN and an SN is configured a C-PSCell, which can be implemented in the UE 102, for example.

The method 1100 starts at block 1102, where the UE receives a first message from the MN (event 308, 904). The first message includes a condition and a C-PSCell configuration configuring a C-PSCell. The UE disconnects from the SN 106B and connects to the C-PSCell if the UE detects the condition is satisfied. At block 1104, the UE detects MCG failure (event 906) and initiate a MCG failure indication procedure (or called MCG failure information procedure) to indicate the MCG failure (event 908). At block 1106, the UE suspends the C-PSCell related action(s) (event 907). At block 1108, the UE determines whether the UE receives a MCG failure recovery message (event 916) within a time period. If the UE receives a MCG failure recovery message with the time period, the UE resumes the C-PSCell related action(s) (event 922). If the UE does not receive a MCG failure recovery message with the time period, the UE releases the C-PSCell configuration and/or the condition at block 1112.

Figure 12:
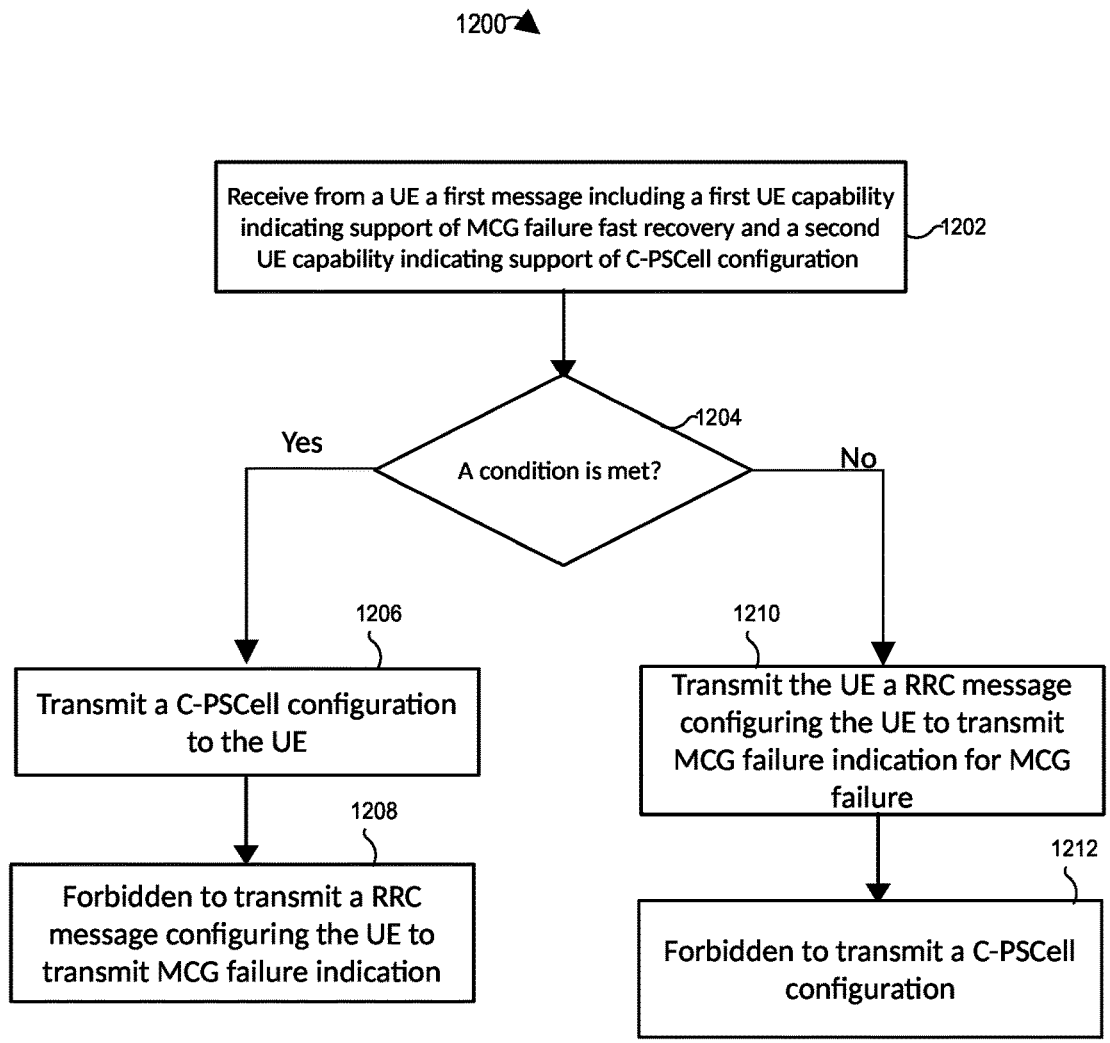
FIG. 12 is a flow diagram of an example method for determining whether the UE should perform a conditional procedure related to the C-PSCell or a procedure for fast recovery of the MCG link, which can be implemented in the MN of FIG. 1.

Next, FIG. 12 illustrates an example method 1200 for managing MCG failure while the UE in DC with an MN and an SN, which can be implemented in the UE 102, for example.

The method 1200 starts at block 1202, where the MN 104 receives a first message from the UE. The first message includes a first UE capability indicating support MCG failure fast recovery and also includes a second UE capability indicating support of C-PSCell configuration (i.e., conditional C-PSCell addition). Then, at block 1206, the MN 104 determines whether a certain condition is satisfied. If the condition is satisfied, the MN 104 transmits a C-PSCell configuration to the UE at block 1206. The MN 104 also prevents transmission of an RRC message configuring the UE to transmit MCG failure indication. That is, the MN 104 ensures that the recovery procedure is not enabled for the UE 102 if the UE 102 is configured with a C-PSCell configuration. On other the other hand, if the condition is not satisfied, at block 1212, the MN 104 transmits to the UE 102 an RRC message configuring the UE to transmit MCG failure indication in event of an MCG failure. In this case, the MN 104 prevents transmission of a C-PSCell configuration to the UE at block 1212. In other words, MN 104 does not configure the UE 102 with a conditional PSCell addition (more generally, a conditional procedure related to an SN) if the MN 104 has configured the UE 102 with an MCG failure indication, which is a part of the MCG failure fast recovery procedure (more generally, a recovery procedure.

According to the method 1200, the MN 104 configures the UE 102 to enable either a recovery procedure or a conditional procedure. The UE 102 thus can perform a maximum of one of these two procedures at the same time. Because the UE 102 cannot execute both of these procedures concurrently, the MN 104 according to the method 1200 effectively eliminates the potential problems due to the interaction between the two procedures.

In some implementations, the condition is that the one or more measurement results received by the MN from the UE fulfill a criterion or criteria to configure the C-PSCell configuration to the UE. In other implementations, the condition is that the MN is configured to enable conditional C-PSCell addition/change or enable the MCG failure fast recovery. If the conditional C-PSCell addition/change is enabled, the MN prepares a C-PSCell configuration for a C-PSCell with a C-SN and transmits the C-PSCell configuration and a condition for the UE to determine to connect to the C-PSCell. If the MCG failure fast recovery is enabled, the MN transmits the UE the RRC message configuring the UE to transmit the MCG failure indication for MCG failure.

Figure 13:
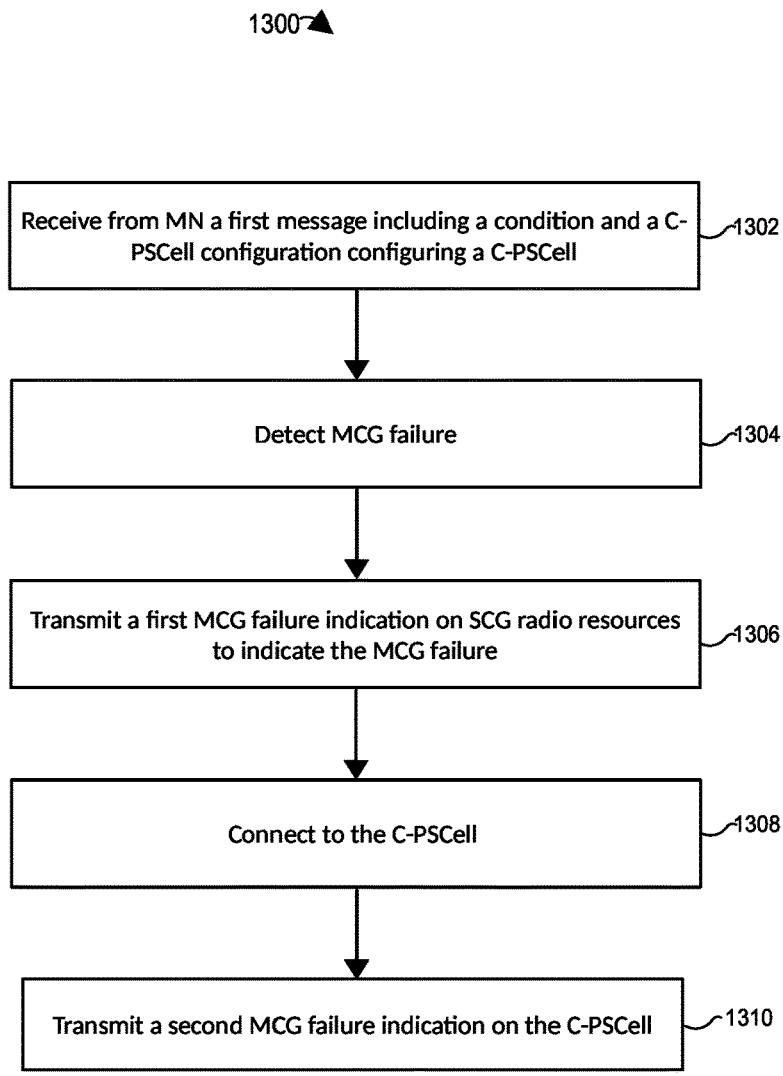
FIG. 13 is a flow diagram of an example method for sending an MCG failure indication to both the SN and the C-SN, which can be implemented in the UE of FIG. 1.

Next, FIG. 13 illustrates an example method 1300 for managing MCG failure while the UE in DC with an MN and an SN is configured a C-PSCell, which can be implemented in the UE 102, for example.

The method 1300 starts at block 1302, where the UE receives a first message from the MN (evet 308, 604). The first message includes a condition and a C-PSCell configuration configuring a C-PSCell. At block 1304, the UE detects MCG failure (event 606). Next, at block 1306, the UE transmits a first MCG failure indication to indicate the MCG failure (event 608). At block 1308, the UE then connects to the C-PSCell (event 618), and sends the a second MCG failure indication on the C-PSCell at block 1310 (308, 468, 708). In some implementations, the first and second MCG failure indications may have the same content. In other implementations, the first and second MCG failure indications may have different content.

In some implementations, the UE may use a first integrity key to generate a first message authentication code (MAC) from the first MCG failure indication. The UE uses a first encryption key to encrypt the first MCG failure indication and the first MAC and includes the encrypted first MCG failure indication and first MAC in a first protocol data unit (PDU). Then the UE transmits the first PDU to a PSCell. The UE may also use the first integrity key to generate a second MAC from the second MCG failure indication. The UE also uses the first encryption key to encrypt the second MCG failure indication and the second MAC and includes the encrypted second MCG failure indication and second MAC in a second PDU. Then the UE transmits the second PDU to the C-PSCell. If the first and second MCG failure indications are the same, the UE may transmit the first PDU to the C-PSCell.

In other implementations, the UE may use a first integrity key to generate a first message authentication code (MAC) from the first MCG failure indication. The UE uses a first encryption key to encrypt the first MCG failure indication and the first MAC and includes the encrypted first MCG failure indication and first MAC in a first protocol data unit (PDU). Then the UE transmits the first PDU to the PSCell. The UE may use a second integrity key to generate a second MAC from the second MCG failure indication. The UE also uses a second encryption key to encrypt the second MCG failure indication and the second MAC and includes the encrypted second MCG failure indication and second MAC in a second PDU. Then the UE transmits the second PDU to the C-PSCell.

In some implementations, the UE may disconnect from the P-SCell and then connect to the C-PSCell. In other implementations, the UE connects to the C-PSCell and then disconnect from the P-SCell. For example, the UE may perform a random access procedure to connect to the C-PS-Cell while the UE communicates with the P-SCell. After the UE successfully completes the random access procedure (e.g., the UE succeeds a contention resolution), the UE disconnects from the P-SCell.

Figure 14:
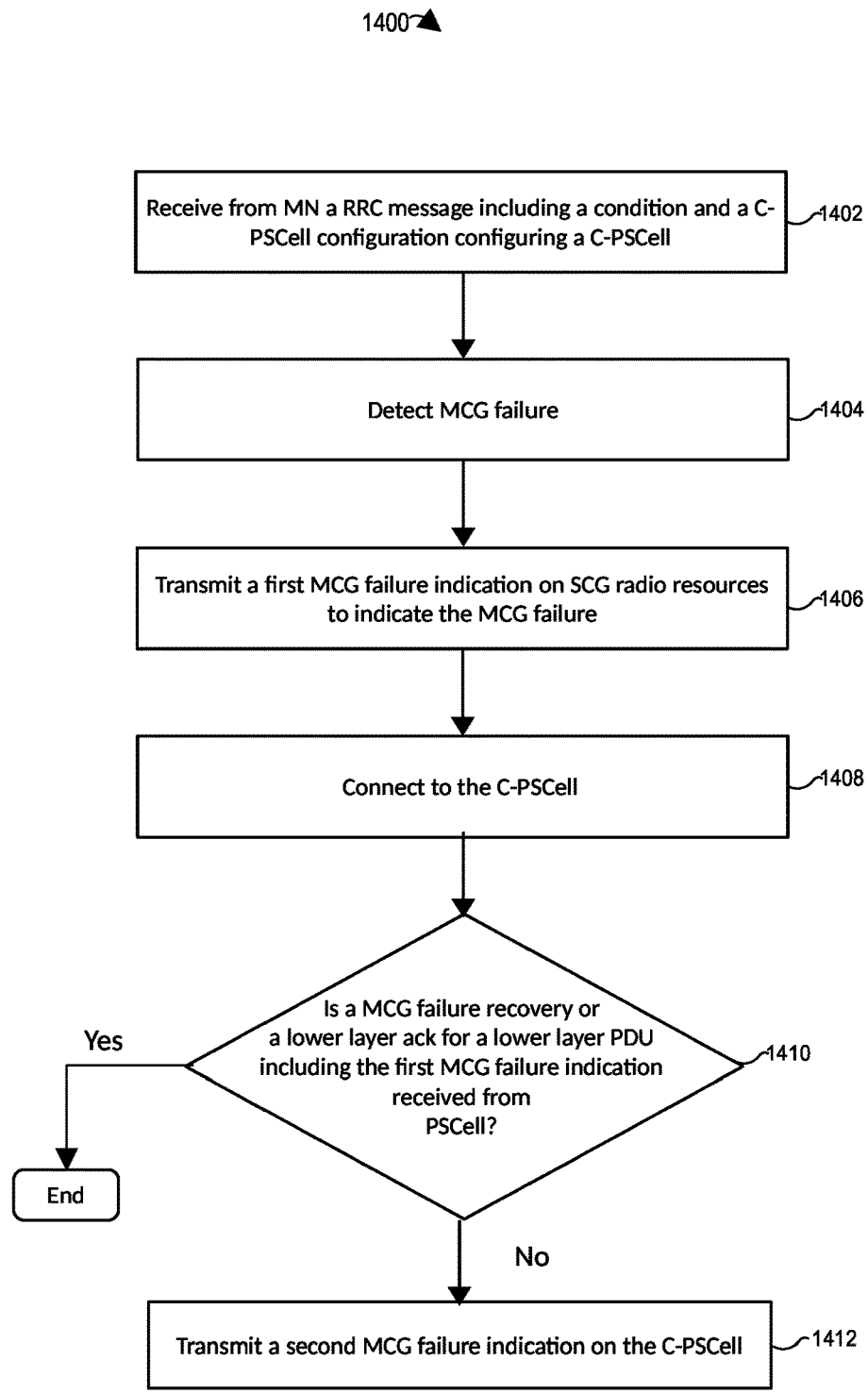
FIG. 14 is a flow diagram of an example method for notifying the C-SN of the MCG failure after determining that the UE has successfully notified the SN of the MCG failure, which can be implemented in the UE of FIG. 1.

Next, FIG. 14 illustrates an example method 1400 for managing MCG failure while the UE in DC with an MN and an SN is configured a C-PSCell, which can be implemented in the UE 102, for example. FIG. 14 is similar to FIG. 13 and only the differences are described below.

At block 1408, the UE determines whether the UE receives a MCG failure recovery message or a lower layer acknowledgement for a lower layer PDU including the first MCG failure indication from the PSCell. If the UE receives a MCG failure recovery message (event 616) or a lower layer acknowledgement for a lower layer PDU including the first MCG failure indication from the PSCell, the UE does not transmit a second MCG failure indication to the C-PS-Cell. Otherwise, the UE transmits 1412 the second MCG failure indication to the C-PSCell.

Figure 15:
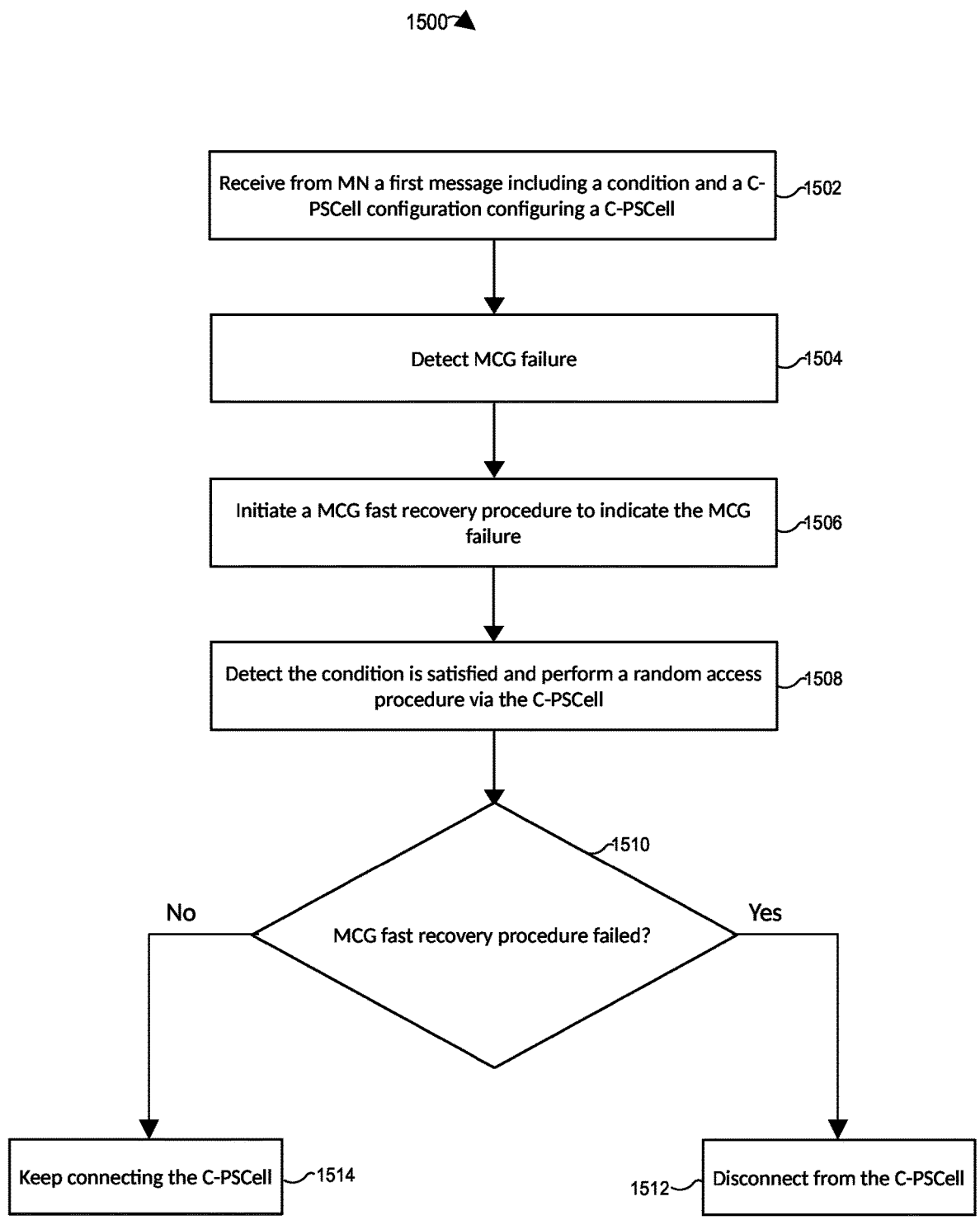
FIG. 15 is a flow diagram of an example method for connecting to the C-PSCell of the C-SN after determining that the procedure for fast recovery of the MCG link has completed successfully, which can be implemented in the UE of FIG. 1.

FIG. 15 illustrates an example method 1500 for managing MCG failure while the UE in DC with an MN and an SN is configured a C-PSCell, which can be implemented in the UE 102, for example. FIG. 15 is similar to FIG. 13 and only the differences are described below.

The method 1500 starts at block 102, where the UE receives a first message from the MN (evet 308, 604). The first message includes a condition and a C-PSCell configuration configuring a C-PSCell. At block 1504, the UE detects MCG failure (event 606). Next, at block 1506, the UE initiates a MCG fast recovery procedure to indicate the MCG failure. At block 1508, the detects the condition is satisfied (event 614) and performs a random access procedure via the C-PSCell in response to the detection (event 618). Then, at block 1510, the UE determines whether the MCG fast recovery procedure failed. If the UE determines the MCG fast recovery procedure failed, the UE disconnects from the C-PSCell. If the UE determines the MCG fast recovery procedure succeeds, the UE keeps connecting to the C-PSCell.

Figure 16:
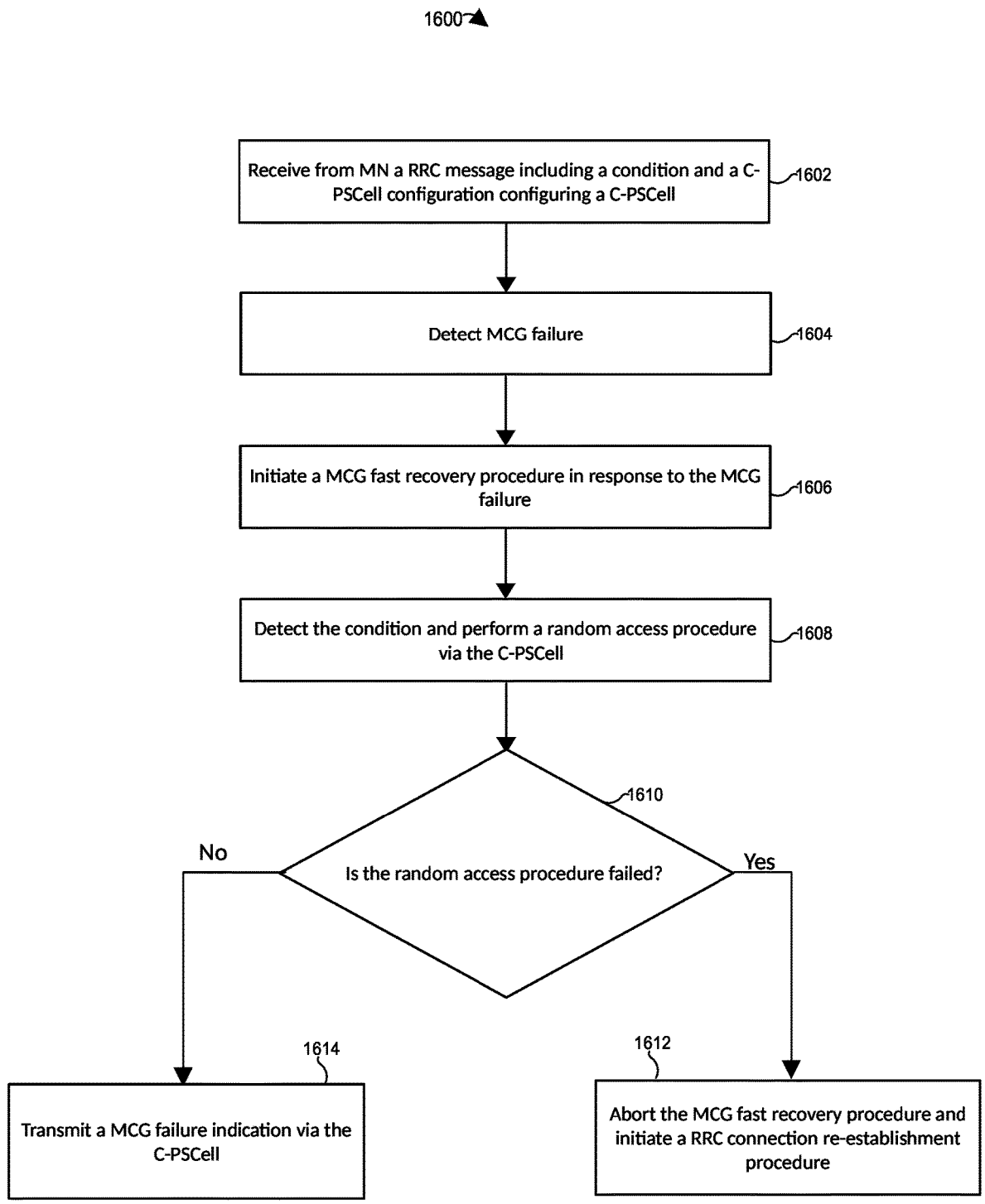
FIG. 16 is a flow diagram of an example method for aborting the procedure for fast recovery of the MCG link in response to the UE failing to connect to the C-PSCell of the C-SN, which can be implemented in the UE of FIG. 1.

Next, FIG. 16 illustrates an example method 1600 for managing MCG failure while the UE in DC with an MN and an SN is configured a C-PSCell, which can be implemented in the UE 102, for example. FIG. 16 is similar to FIG. 13 and FIG. 15 and only the differences are described below.

At block 1610, the UE determines whether the random access procedure (event 618) failed. If the UE determines the random access procedure failed, the UE aborts the MCG fast recovery procedure and initiates an RRC connection re-establishment procedure at block 1612. Otherwise, the UE transmits a MCG failure indication via the C-PSCell at block 1614 (event 620).

Figure 17:
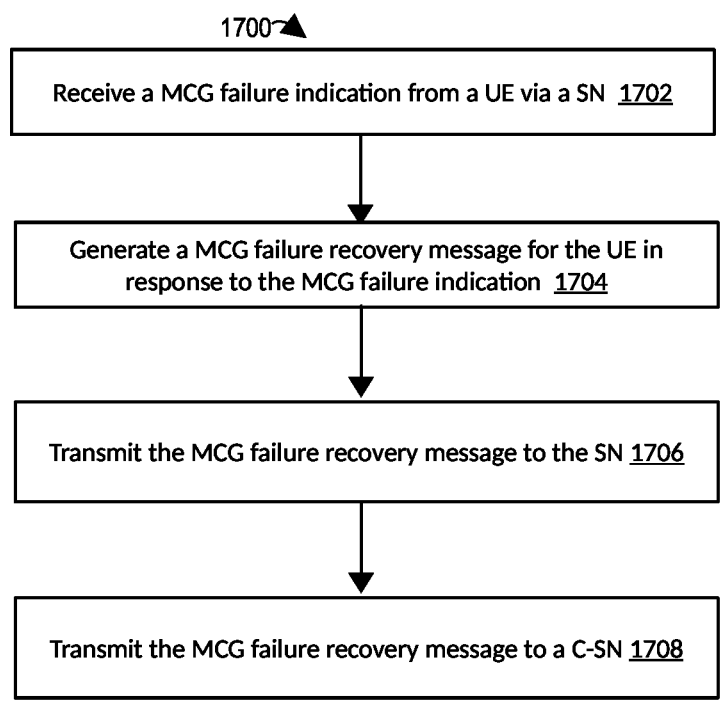
FIG. 17 is a flow diagram of an example method for notifying the SN and C-SN that the MCG link has failed, which can be implemented in the MN of FIG. 1.

FIG. 17 illustrates an example method 1700 for managing MCG failure while the UE in DC with an MN and an SN is configured a C-PSCell, which can be implemented in the MN 104, for example.

At block 1702, the MN receives a MCG failure indication from a UE via an SN. At block 1704, the MN generates a MCG failure recovery message for the UE in response to the MCG failure indication. The MN transmits the MCG failure recovery message to an SN at block 1706 and transmits the MCG failure recovery message to a C-SN at block 1708. If the UE connects to the C-SN via a C-PSCell, the C-SN transmits the MCG failure recovery message to the UE. If the UE still connects to the SN via a PSCell, the SN transmits the MCG failure recovery message to the UE.

Figure 18:
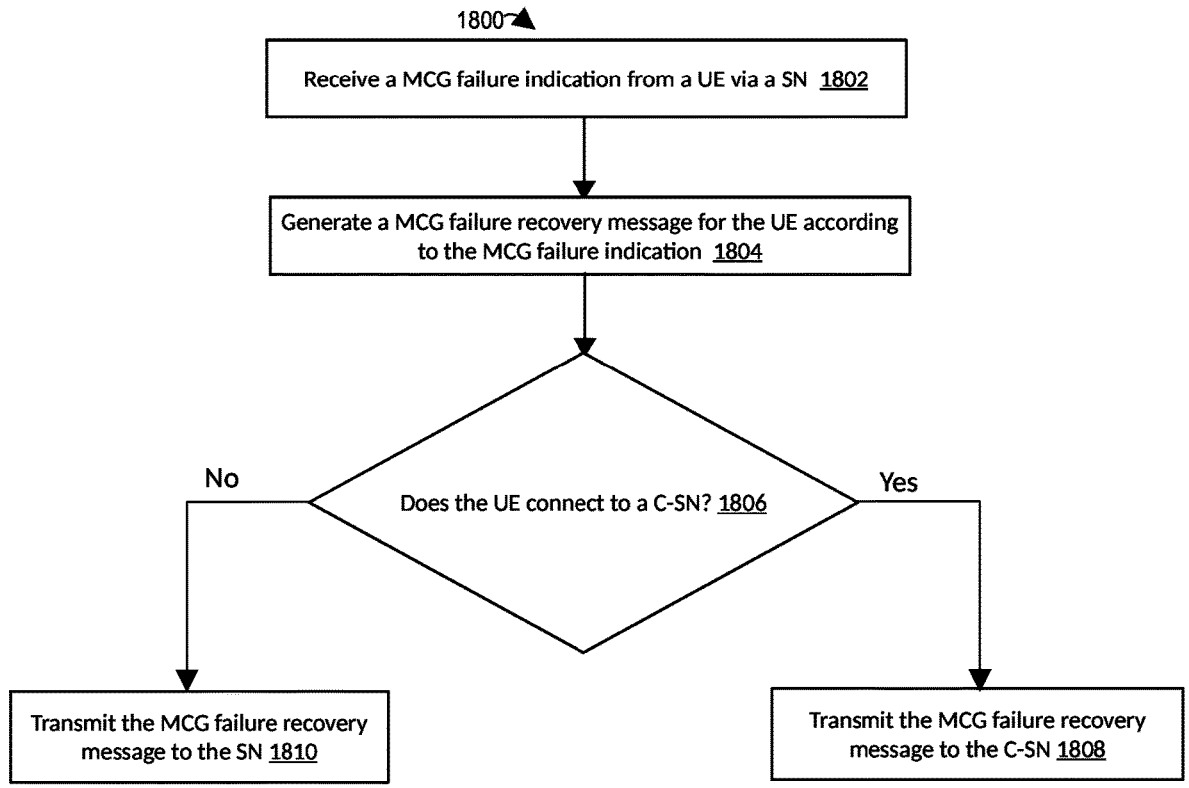
FIG. 18 is a flow diagram of another example method for notifying the SN and C-SN that the MCG link has failed, which can be implemented in the MN of FIG. 1.

FIG. 18 illustrates an example method 1800 for managing MCG failure while the UE in DC with an MN and an SN is configured a C-PSCell, which can be implemented in the MN 104, for example. FIG. 18 is similar to FIG. 17.

At block 1802, the MN receives a MCG failure indication from a UE via a first SN. At block 1804, the MN generates a MCG failure recovery message for the UE in response to the MCG failure indication. The MN determines whether UE connects to the C-SN at block 1806. If the MN determines the UE still connects to the SN, the MN transmits the MCG failure recovery message to the SN at block 1808. If the MN determines the UE connects to a C-SN, the MN transmits the MCG failure recovery message to the C-SN at block 1810.

In some implementations, the MN determines the UE connects to the C-SN if the MN receives a message (e.g., an RRC message) from the UE and the message indicates the UE connects to a C-PSCell of the C-SN. In other implementations, the MN determines the UE connects to the C-SN if the MN receives an interface message from the C-SN and the interface message indicates the UE connects to the C-SN. If the MN neither receives the message nor the interface message, the MN determines the UE still connects to the SN.

Figure 19:
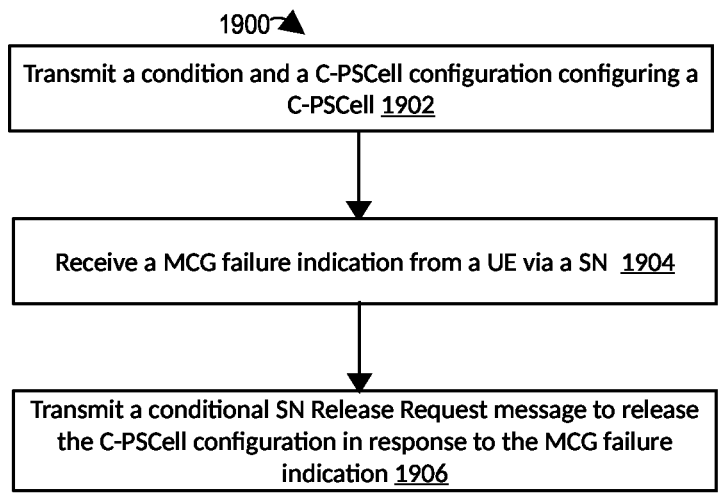
FIG. 19 is a flow diagram of an example method for processing an indication from the UE that the MCG has failed, which can be implemented in the MN of FIG. 1.

FIG. 19 illustrates an example method 1900 for managing MCG failure while the UE in DC with an MN and an SN is configured a C-PSCell, which can be implemented in the MN 104, for example.

At block 1902, the MN transmits a condition and a C-PSCell configuration configuring a C-PSCell (event 350, 704). At block 1904, the MN receives a MCG failure indication message from a UE via an SN (event 708, 710). Then the MN transmits a conditional SN Release Request message to release the C-PSCell configuration (event 718) in response to the MCG failure indication at block 1906.

Figure 20:
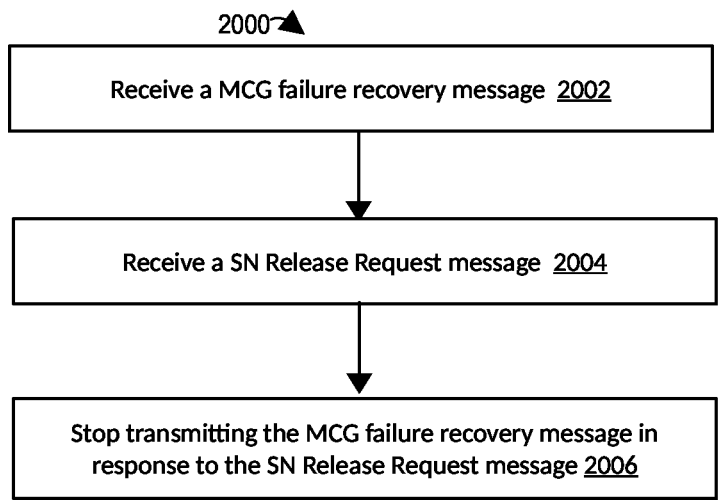
FIG. 20 is a flow diagram of an example method for processing an MCG failure recovery message and an SN Release Request message, which can be implemented in the SN of FIG. 1.

FIG. 20 illustrates an example method 2000 for managing MCG failure while the UE in DC with an MN and an SN is configured a C-PSCell, which can be implemented in the SN 106B, for example.

At block 2002, the SN receives a MCG failure recovery message (event 612, 712, 812, 912) from the MN. At block 2004, the SN receives an SN Release Request message from the MN. Then at block 2006, the SN stops transmitting the MCG failure recovery message in response to the SN Release Request message. In some implementations, the SN clears the MCG failure recovery message from storage of the SN.

Figure 21:
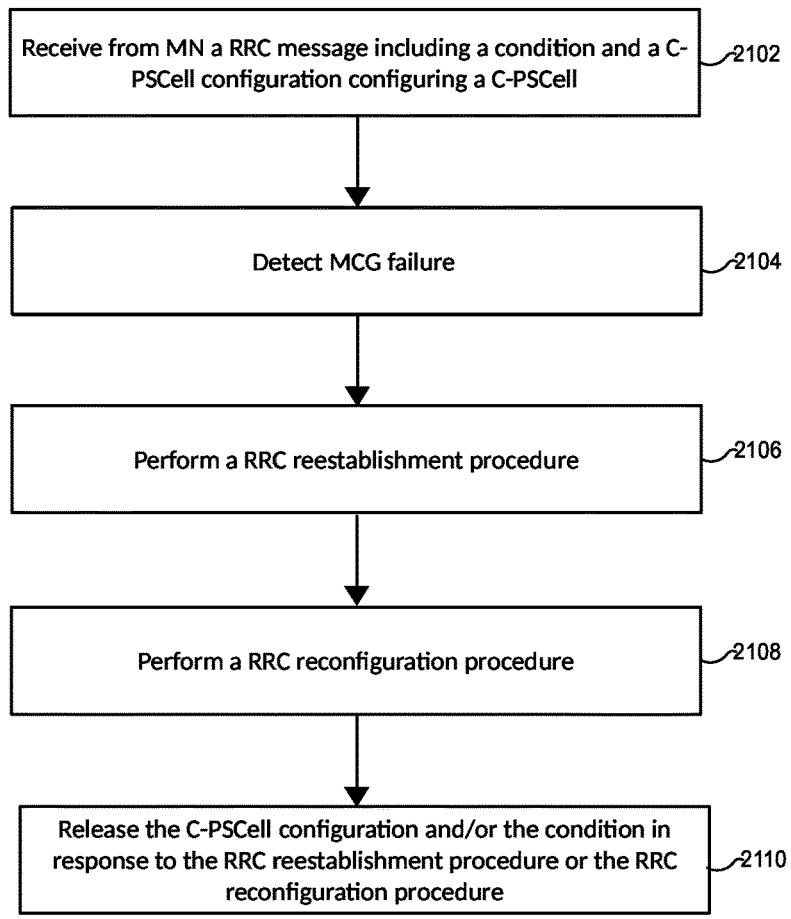
FIG. 21 is a flow diagram of an example method that includes releasing the C-PSCell configuration upon performing RRC reestablishment after MCG link failure, which can be implemented in the UE of FIG. 1.

FIG. 21 illustrates an example method 2100 for managing MCG failure while the UE in DC with an MN and an SN is configured a C-PSCell, which can be implemented in the UE 102, for example.

At block 2102, the UE receives from the MN an RRC message including a condition and a C-PSCell configuration configuring a C-PSCell. Then the UE 102 detects MCG failure at block 2104. At block 2106, the UE 102 performs an RRC reestablishment procedure with the MN or a target base station in response to the MCG failure. At block 2108, the UE 102 performs an RRC reconfiguration message with the MN or the target base station after/while performing the RRC reestablishment procedure. At block 2110, the UE releases the C-PSCell configuration and/or condition in response to the RRC reestablishment procedure or the RRC reconfiguration procedure.

Figure 22:
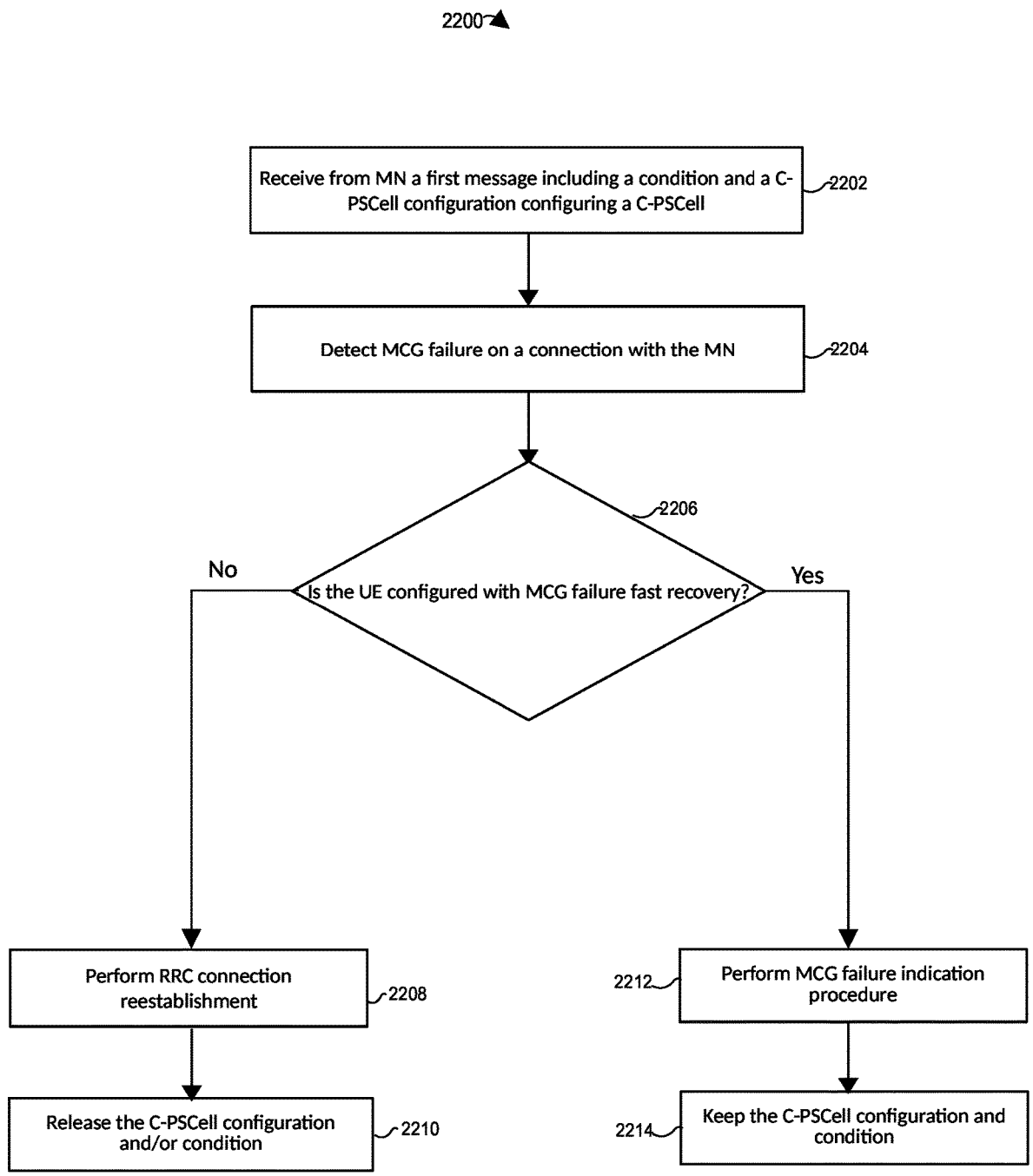
FIG. 22 is a flow diagram of an example method that includes determining whether the UE should perform an RRC reestablishment procedure or the procedure for fast recovery of the MCG link, which can be implemented in the UE of FIG. 1.

FIG. 22 illustrates an example method 2200 for managing MCG failure while the UE in DC with an MN and an SN is configured a C-PSCell, which can be implemented in the UE 102, for example.

At block 2202, the UE receives from the MN a first message including a condition and a C-PSCell configuration configuring a C-PSCell (event 308, 704, 804). Then the UE 102 determines 2206 whether the MCG failure fast recovery is configured. If the MCG failure fast recovery is not configured, the UE 102 performs an RRC reestablishment procedure with the MN or a target base station at block 2208 in response to the MCG failure, and releases the C-PSCell configuration and/or condition at block 2210. If the MCG failure fast recovery message is configured, the UE 102 performs a MCG failure indication procedure at block 2212 and keeps the C-PSCell configuration and condition at block 2214.

Figure 23:
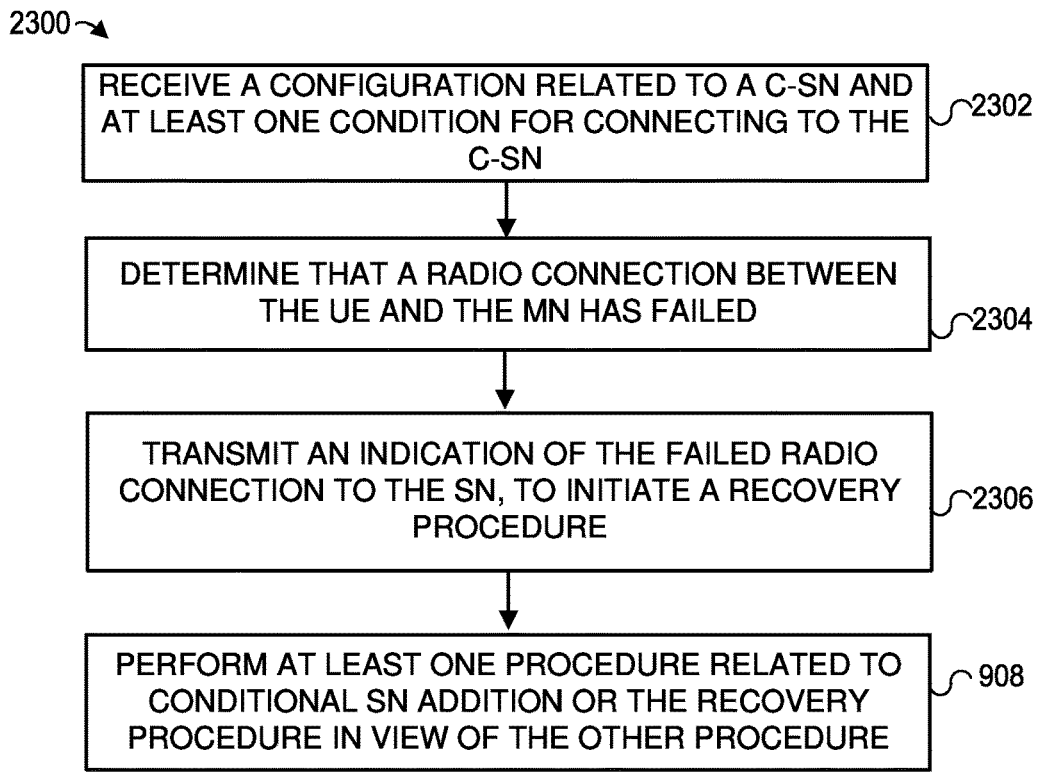
FIG. 23 is a flow diagram of an example method for failure recovery which can be implemented in the UE of FIG. 1.

FIG. 23 illustrates an example method 2300 for failure recovery, which can be implemented in the UE 102 or another suitable UE. The method 2300 begins at block 2302, where the UE 102 receives C-SN connection information that can include C-PSCell configuration and/or one or more conditions for connecting to the C-PSCell or, more generally, the C-SN (see, e.g., events 604, 704, 804, 844, 874, 904, 1002, 1102, 1302, 1402, 1502, 1602, 2202).

At block 2304, the UE 102 determines that the radio connection between the UE and the MN has failed, e.g., an MCG failure (see, e.g., events 606, 706, 806, 846, 876, 906, 1004, 1104, 1303, 1404, 1504, 1604, 2204). Next, at block 2306, the UE 102 transmits an indication of the failed radio connection to the SN (e.g., the MCG failure indication), in order to initiate a recovery procedure (e.g., the fast MCG recovery procedure) (see, e.g., events 608, 708, 808, 908, 1006, 1306, 1406, 1506, 1606, 2212).

Then, at block 908, the UE 102 performs at least one procedure related to conditional SN addition or the recovery procedure in view of the other procedure. In other words, the UE 102 adjusts at least one parameter of one of these procedures. To this end, the UE 102 can transmit another message, modify the timing of certain notifications, make execution of one of the procedures conditional, etc. For example, the UE 102 can perform at least one of releasing the configuration and/or the at least one condition (see, e.g., events 720, 807, 887, 1010, 1112), or suspending a procedure (see, e.g., events 907, 1106), for connecting to the C-SN; transmitting to the C-SN a second indication of the failed radio connection (see, e.g., event 620, 1310, 1412); in response to determining that the recovery procedure has failed and that the UE has connected to the C-SN, disconnecting from the C-SN (see, e.g., event 1512); or in response to determining that an attempt to connect to the C-SN has failed, aborting the recovery procedure (see, e.g., event 1612).

Figure 24:
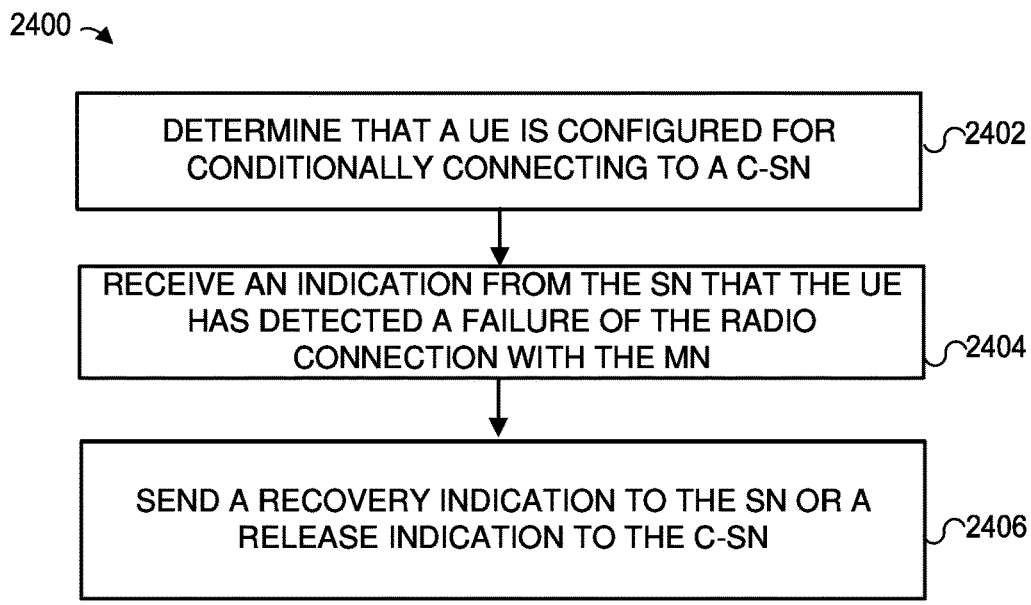
FIG. 24 is a flow diagram of an example method for processing an indication that a radio connection between the UE and the MN, such as the MCG link, has failed, which can be implemented in the MN of FIG. 1.

FIG. 24 illustrates an example method 2400 for processing an indication that a radio connection between the UE and the MN, such as the MCG link, has failed, which can be implemented in the MN 104 for example or another suitable base station. At block 2402, the MN 104 determines that the UE 102 is configured for conditional connection to a C-SN. At block 2404, the MN 104 receives an indication from the SN (e.g., the SN 106B) that the UE has detected a failure of the radio connection with the MN 104. At block 2406, the MN sends a recovery indication to the SN (see, e.g., events 626, 1708, 1810) or a release indication to the C-SN (see, e.g., events 718, 818, 858, 888, 1906).

Figure 25:
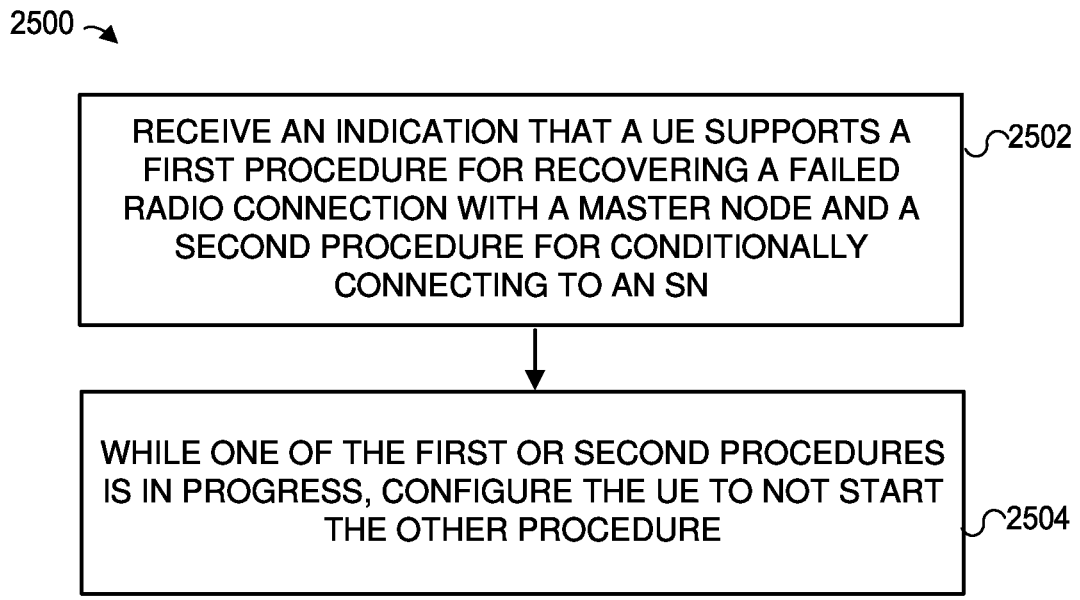
FIG. 25 is a flow diagram of an example method for determining whether the UE should perform a procedure for fast recovery of the MCG link or a conditional procedure related to the C-SN, which can be implemented in the MN of FIG. 1.

Finally, FIG. 25 illustrates an example method 2500 for determining whether the UE should perform a procedure for fast recovery of the MCG link or a conditional procedure related to the C-SN, which can be implemented in the MN of FIG. 1. At block 2502, the MN 104 receives an indication that the UE 102 supports a recovery procedure as well as a conditional procedure (see, e.g., event 1202). At block 2504, the MN 104 configures to not start the recovery or the conditional procedure while the other procedure is in progress (see, e.g., events 1208 and 1212).

The following additional considerations apply to the foregoing discussion.

If the UE 102 releases a C-PSCell configuration configuring a C-PSCell, the UE 102 determines the C-PSCell configuration no longer valid. Unless the UE 102 receives a new C-PSCell configuration configure the C-PSCell or receiving a message commanding the UE to connect to the C-PSCell, the UE does not connect to the C-PCell. If the UE 102 releases a C-PSCell configuration configuring a C-PSCell, the UE 102 does not connect to the C-PSCell irrespective of whether the UE 102 evaluates (determines or detects) a condition for connecting to a C-PSCell configured by the C-PSCell configuration, and irrespective of (or even though) the UE recovers the MCG failure. In some implementations, the UE 102 stops evaluating the condition if the UE 102 releases the C-PSCell configuration. Thus, the UE 102 does not disconnect from the SN 106B and connects to the C-PSCell because the UE 102 does not determine the condition is satisfied. In other implementations, the UE 102 keeps evaluating whether the condition is satisfied. If the condition is satisfied, the UE 102 does not disconnect from the SN 106B and connects to the C-PSCell.

If the UE 102 releases the condition for the C-PSCell configuration, the UE 102 determines the condition no longer valid. Unless the UE 102 receives a new condition for the C-PSCell configuration or receiving a message commanding the UE to connect to the C-PSCell, the UE does not connect to the C-PCell. If the UE 102 releases the condition for connecting to a C-PSCell configured by the C-PSCell configuration, the UE 102 stops evaluating the condition if the UE 102 releases the C-PSCell configuration. Thus, the UE 102 does not disconnect from the SN 106B and connects to the C-PSCell because the UE 102 does not determine the condition is satisfied irrespective of whether the UE releases the C-PSCell configuration.

In some implementations, the UE 102 may include a failure cause in the MCG failure indication message. If the MCG failure is radio link failure, the UE indicates radio link failure in the failure cause. If the MCG failure is integrity check failure, the UE indicates integrity check failure in the failure cause. If the MCG failure is handover failure, the UE indicates handover failure in the failure cause. If the MCG failure is reconfiguration failure, the UE indicates reconfiguration failure in the failure cause. If the MCG failure is reconfiguration with sync failure, the UE indicates reconfiguration with sync failure in the failure cause.

In some implementations, the UE 102 may include one or more measurement results associated to one or different cells in the MCG failure indication message. In one implementation, the MN may generate the MCG recovery message according to the one or more measurement results. The MN configures a target cell, which is associated to one or more particular measurement results in the MCG failure indication message, in the MCG recovery message. The MN may include a random access configuration in the MCG failure indication message. In response to the MCG recovery message, the UE performs a random access procedure with via the target cell according to the random access configuration. In another implementation, the MN may determine a target cell which the MN determine according to one or some of the measurement result(s). For example, the one or some of the measurement result(s) of the target cell indicate the target cell has good signal strength/quality for the UE. Then the MN may send a target base station (not shown in FIG. 1) a Handover Request message indicating the target cell. The target base station generates the MCG failure recovery message and includes the MCG failure recovery message in a Handover Request Acknowledge message. The target base station may include a random access configuration in the MCG failure indication message. In response to the MCG recovery message, the UE performs a random access procedure with via the target cell according to the random access configuration. Then the target base station sends the Handover Request Acknowledge message to the MN. Finally, the MN extracts the MCG failure recovery message from the Handover Request Acknowledge message and transmits the MCG failure recovery message to the UE.

In some implementations, the random access configuration may configure a 2-step random access. In another implementation, the random access configuration may configure a 4-step random access. In yet another implementation, the random access configuration may configure a contention-base random access or a contention-free random access. The UE may transmit a MCG failure recovery response message to the cell in the random access procedure or after successfully completing the random access procedure. The cell can be the same as or different from a cell where the UE detects the MCG failure.

In some implementations, the MCG failure indication can be an MCG Failure Information message (MCGFailureInformation). The MCG failure recovery message can be an RRCReconfiguration message or an RRCConnectionReconfiguration message. The MCG failure recovery response message can be an RRCReconfigurationComplete message or an RRCConnectionReconfigurationComlete message. In one implementation, the RRCReconfiguraiton message includes a ReconfigurationWithSync information element (IE) including the random access configuration. In another implementation, the RRCConnectionReconfiguration message includes an mobilityControlInfo IE including the random access configuration.

A user device in which the techniques of this disclosure can be implemented (e.g., the UE 102) can be any suitable device capable of wireless communications such as a smartphone, a tablet computer, a laptop computer, a mobile gaming console, a point-of-sale (POS) terminal, a health monitoring device, a drone, a camera, a media-streaming dongle or another personal media device, a wearable device such as a smartwatch, a wireless hotspot, a femtocell, or a broadband router. Further, the user device in some cases may be embedded in an electronic system such as the head unit of a vehicle or an advanced driver assistance system (ADAS). Still further, the user device can operate as an internet-of-things (IoT) device or a mobile-internet device (MID). Depending on the type, the user device can include one or more general-purpose processors, a computer-readable memory, a user interface, one or more network interfaces, one or more sensors, etc.

Certain embodiments are described in this disclosure as including logic or a number of components or modules. Modules may can be software modules (e.g., code, or machine-readable instructions stored on non-transitory machine-readable medium) or hardware modules. A hardware module is a tangible unit capable of performing certain operations and may be configured or arranged in a certain manner. A hardware module can comprise dedicated circuitry or logic that is permanently configured (e.g., as a special-purpose processor, such as a field programmable gate array (FPGA) or an application-specific integrated circuit (ASIC), a digital signal processor (DSP), etc.) to perform certain operations. A hardware module may also comprise programmable logic or circuitry (e.g., as encompassed within a general-purpose processor or other programmable processor) that is temporarily configured by software to perform certain operations. The decision to implement a hardware module in dedicated and permanently configured circuitry, or in temporarily configured circuitry (e.g., configured by software) may be driven by cost and time considerations.

When implemented in software, the techniques can be provided as part of the operating system, a library used by multiple applications, a particular software application, etc. The software can be executed by one or more general-purpose processors or one or more special-purpose processors.

The following list of aspects reflects a variety of the embodiments explicitly contemplated by the present disclosure.

1. A method for failure recovery in a user equipment (UE) communicating in dual connectivity (DC) with a master node (MN) and a secondary node (SN), the method comprising: receiving, by one or more processors, candidate secondary node (C-SN) connection information including a configuration related to a C-SN and at least one condition for connecting to the C-SN; and determining, by the one or more processors, that a radio connection between the UE and the MN has failed; transmitting to the SN, by the one or more processors, a first indication of the failed radio connection to initiate a recovery procedure; and performing, by the one or more processors, at least one of: (i) releasing the C-SN connection information, or suspending a procedure, for connecting to the C-SN, (ii) transmitting to the C-SN a second indication of the failed radio connection, (iii) in response to determining that the recovery procedure has failed and that the UE has connected to the C-SN, disconnecting from the C-SN; or (iv) in response to determining that an attempt to connect to the C-SN has failed, aborting the recovery procedure.

Aspect 2. The method of aspect 1, wherein the performing includes: releasing the C-SN connection information in response to determining that the recovery procedure has successfully completed.

Aspect 3. The method of aspect 1, wherein the performing includes: releasing the C-SN connection information prior to transmitting the first indication to the SN.

Aspect 4. The method of aspect 3, wherein the performing further includes: sending, to the MN, a request to reestablish the radio connection subsequently to releasing the C-SN connection information.

Aspect 5. The method of aspect 3, wherein the performing further includes: releasing the C-SN connection information in response to receiving, from the MN, a command to reconfigure the radio connection.

Aspect 6. The method of aspect 1, wherein the performing includes: suspending the procedure for connecting to the C-SN prior to transmitting the first indication to the SN.

Aspect 7. The method of aspect 6, further comprising: resuming the procedure for connecting to the C-SN in response to receiving an indication that the radio connection between the UE and the MN is recovered.

Aspect 8. The method of aspect 6, further comprising: releasing the C-SN connection information for connecting to the C-SN in response to not receiving, within a predetermined period of time, an indication that the radio connection between the UE and the MN is recovered.

Aspect 9. The method of aspect 1, wherein the performing includes: transmitting the second indication subsequently to determining that the recovery procedure has completed successfully.

Aspect 10. The method of aspect 9, wherein determining that the recovery procedure has completed successfully includes receiving, from the SN, at least one of (i) a lower layer acknowledgement to the first indication, or (ii) a message indicating successful completion of the recovery procedure, transmitted at a layer of the first indication.

Aspect 11. The method of aspect 1, wherein the performing further includes, in response to (i) determining that the recovery procedure has failed and that the UE has connected to the C-SN or (i) determining that the attempt to connect to the C-SN has failed: sending, to the MN, a request to reestablish the radio connection.

Aspect 12. The method of any of the preceding aspects, wherein the configuration relates to a candidate primary secondary cell (C-PSCell) covered by the C-SN.

Aspect 13. The method of any of the preceding aspects, wherein the connecting to the C-SN includes performing a random access procedure with a cell of the C-SN.

Aspect 14. The method of any of the preceding aspects, wherein: the recovery procedure is a fast master cell group (MCG) recovery procedure, the first indication is an MCG failure indication, and the SN transmits an MCG failure recovery message to the UE to indicate that the MCG fast recovery procedure has completed successfully.

Aspect 15. A user equipment (UE) comprising processing hardware and configured to implement a method according to any of aspects 1-14.

Aspect 16. A method for facilitating failure recovery, in a first base station operating as a master node (MN) connected to a UE in dual connectivity (DC) with the MN and a second base station operating as a secondary node (SN), the method comprising: determining, by one or more processors, that the UE is configured for conditionally connecting to a third base station operating as a candidate SN (C-SN), to operate in DC with the MN and the third base station; receiving, by the one or more processors from the SN, a first indication that the UE has detected a failure of a radio connection between the UE and the MN; and sending, by the one or more processors to the third base station, one of: a recovery indication to indicate that the radio connection between the UE and the MN is recovered, or a release indication to indicate that the third base station should be released from operating as the C-SN.

Aspect 17. The method of aspect 16, wherein the recovery indication is a second recovery indication; the method further comprising: sending, by the one or more processors to the SN, a first recovery indication to indicate that the radio connection between the UE and the MN is recovered.

Aspect 18. The method of aspect 16, the method further comprising: receiving, by the one or more processors from the C-SN, a second indication that the UE has detected the failure of the radio connection; wherein sending the recovery indication is in response to receiving the second indication.

Aspect 19. The method of aspect 16, wherein sending the release indication includes sending a Conditional SN Release Request to the C-SN.

Aspect 20. The method of aspect 16, wherein: receiving the first indication that the UE has detected the failure of the radio connection includes receiving a master cell group (MCG) failure indication message associated with a fast MCG recovery procedure, and sending the recovery indication includes sending an MCG failure recovery message.

Aspect 21. A method in a first base station for controlling failure recovery at a UE, the method comprising: receiving, by one or more processors from the UE, an indication that the UE supports (i) a first procedure for recovering a failed radio connection with a master node (MN) by transmitting an indication related to the failed radio connection to a secondary node (SN), when the UE operates in DC with the MN and the SN, and (ii) a second procedure for conditionally connecting to a candidate SN (C-SN); and configuring, by the one or more processors, the UE to not start the first procedure or the second procedure while the other one of the first procedure or the second procedure is in progress.

Aspect 22. The method of aspect 21, further comprising: determining whether the UE is configured, at a network in which the first base station operates, to support the first procedure or the second procedure.

Aspect 23. The method of aspect 21, further comprising: determining whether the UE is configured, at a network in which the first base station operates, to prefer the first procedure over the second procedure.

Aspect 24. The method of any of aspects 21-23, wherein the configuring includes: sending a configuration for a candidate primary secondary cell (C-PSCell) associated with the C-SN to the UE, and preventing the base station from sending to the UE an indication that the base station has enabled the first procedure.

Aspect 25. The method of any of aspects 21-23, wherein the configuring includes: sending to the UE an indication that the base station has enabled the first procedure, and preventing the base station from sending to the UE a configuration for a C-PSCell associated with the C-SN.

Aspect 26. A method for facilitating recovery of a radio connection, implemented in a base station operating as a secondary node (SN) connected to a user equipment (UE) in dual connectivity (DC) with a master node (MN) and the SN, the method comprising: receiving, by one or more processors from the MN, a recovery message associated with a procedure for recovering a radio connection between the UE and the MN; sending, by the one or more processors, the recovery message to the UE, during a transmission period; receiving, during the transmission period, an indication that the base station is released from operating as the SN; and in response to the indication, aborting the sending of the recovery message.

Aspect 27. The method of aspect 26, wherein the recovery message is an MCG failure recovery message.

Aspect 28. The method of aspect 26, wherein the indication is an SN Release Request message.

Aspect 29. The method of aspect 26, wherein sending the recovery message includes re-transmitting the recovery message to the UE multiple times during the transmission period.

Aspect 30. A base station comprising one or more processors and configured to implement a method of any of aspects 16-29.

What is claimed is:

1. A method for failure recovery in a user equipment (UE) communicating in dual connectivity (DC) with a master node (MN) and a secondary node (SN), the method comprising:
receiving, by the UE, candidate secondary node (C-SN) connection information including a configuration related to a C-SN and at least one condition for connecting to the C-SN;
determining, by the UE, that a radio connection between the UE and the MN has failed;
transmitting to the SN, by the UE, MCG failure indication of the failed radio connection to initiate a fast master cell group (MCG) recovery procedure;
suspending a procedure for connecting to the C-SN; and
receiving, from the SN, an MCG failure recovery message indicating that the MCG fast recovery procedure has completed successfully; and
releasing the C-SN connection information in response to determining that the MCG fast recovery procedure has completed successfully.

2. The method of claim 1, wherein the
receiving of the MCG failure recovery message includes receiving, from the MN, a command to reconfigure the radio connection.

3. The method of claim 1, wherein the
suspending the procedure for connecting to the C-SN occurs prior to transmitting the MCG failure indication to the SN.

4. The method of claim 1, wherein the configuration relates to a candidate primary secondary cell (C-PSCell) covered by the C-SN.

5. A method for facilitating failure recovery, in a first base station operating as a master node (MN) connected to a UE in dual connectivity (DC) with the MN and a second base station operating as a secondary node (SN), the method comprising:

determining, by the first base station, that the UE is configured for conditionally connecting to a third base station operating as a candidate SN (C-SN), to operate in DC with the MN and the third base station;
receiving, by the first base station from the SN, a first indication that the UE has detected a failure of a radio connection between the UE and the MN; and
sending, by the first base station to the third base station, a release indication to indicate that the third base station should be released from operating as the C-SN.

6. The method of claim 5, wherein sending the release indication includes sending a Conditional SN Release Request to the C-SN.

7. The method of claim 5, wherein:
receiving the first indication that the UE has detected the failure of the radio connection includes receiving a master cell group (MCG) failure indication message associated with a fast MCG recovery procedure, and
sending the recovery indication includes sending an MCG failure recovery message.

8. A user equipment (UE) comprising processing hardware and configured to:
communicate in dual connectivity (DC) with a master node (MN) and a secondary node (SN);
receive candidate secondary node (C-SN) connection information including a configuration related to a C-SN and at least one condition for connecting to the C-SN;
determine that a radio connection between the UE and the MN has failed;
transmit an MCG failure indication of the failed radio connection to initiate a fast master cell group (MCG) recovery procedure;
suspend a procedure for connecting to the C-SN;
receive, from the SN, an MCG failure recovery message indicating that the MCG fast recovery procedure has completed successfully; and
release the C-SN connection information in response to determining that the MCG fast recovery procedure has completed successfully.

9. The UE of claim 8, wherein the receiving of the MCG failure recovery message includes a command to reconfigure the radio connection.

10. The UE of claim 8, wherein the UE is configured to suspend the procedure for connecting to the C-SN prior to transmitting the MCG failure indication to the SN.

11. The UE of claim 8, wherein the configuration relates to a candidate primary secondary cell (C-PSCell) covered by the C-SN.

* * * * *